United States Patent [19]

Flanagan et al.

[11] Patent Number: 5,737,485
[45] Date of Patent: Apr. 7, 1998

[54] METHOD AND APPARATUS INCLUDING MICROPHONE ARRAYS AND NEURAL NETWORKS FOR SPEECH/SPEAKER RECOGNITION SYSTEMS

[75] Inventors: James L. Flanagan, Warren; Qiguang Lin, Highland Park; Mazin Rahim, Manalapan; Chiwei Che, Edison, all of N.J.

[73] Assignee: Rutgers The State University of New Jersey, New Brunswick, N.J.

[21] Appl. No.: 399,445

[22] Filed: Mar. 7, 1995

[51] Int. Cl.$^6$ ............................... G10L 9/00; G10L 5/06
[52] U.S. Cl. .................. 395/2.41; 395/2.53; 395/2.43
[58] Field of Search ........................... 395/2.09, 2.1, 395/2.11, 2.4, 2.41, 2.35, 2.36, 2.37, 2.42, 2.5, 2.56, 2.6, 2.61, 2.67, 2.68, 21, 23, 24, 2.53

[56] References Cited

U.S. PATENT DOCUMENTS

| | | | |
|---|---|---|---|
| 3,287,649 | 11/1966 | Rosenblatt | 395/24 |
| 5,003,490 | 3/1991 | Castelaz et al. | 395/22 |
| 5,040,215 | 8/1991 | Amano et al. | 395/2.41 |
| 5,150,323 | 9/1992 | Castelaz | 395/23 |
| 5,179,624 | 1/1993 | Amano et al. | 395/2 |
| 5,185,848 | 2/1993 | Aritsuka et al. | 395/2 |
| 5,212,764 | 5/1993 | Ariyoshi | 395/2 |
| 5,307,444 | 4/1994 | Tsuboka | 395/2.41 |
| 5,315,704 | 5/1994 | Shinta et al. | 395/2.41 |
| 5,353,376 | 10/1994 | Oh et al. | 395/2.42 |

OTHER PUBLICATIONS

Che, Lin, Pearson, de Vries, and Flanagan, "Microphone Arrays and Neural Networks for Robust Speech Recognition:, *Proceedings of the ARPA Human Language Technology Workshop*, pp. 321–326, Mar. 1994, Princeton, NJ.

Lin, Che, and Flanagan, "Microphone Array and Neural Network System for Speaker Identification", *Proceedings of the ARPA Spoken Language Systems Technology Workshop*, pp. 321–326, Mar. 1994, Princeton, NJ.

Qiguang Lin, Ea–Ee Jan, ChiWei Che, and James Flanagan, *Microphone Array and Neural Network System For Speaker Identification*, Rutgers University, sent to Carnegie Mellon May 1994 for consideration.

C. Che, Q. Lin, J. Pearson, B. de Vries, and J. Flanagan, *Microphone Arrays and Neural Networks for Robust Speech Recognition*, Rutgers University, Mar. 10, 1994.

Qiguang Lin, Ea–Ee Jan, James Flanagan, *Microphone Arrays and Speaker Identification*, IEEE Transactions on Speech and Audio Processing, vol. 2, No. 4, pp. 622–629, Oct. 1994.

Q. Lin, E. Jan, C. Che, and J. Flanagan, *Speaker Identification in Teleconferencing Environments Using Microphone Arrays and Neural Networks*, ESCA Workshop on Automatic Speaker Recognition, Identification and Verification, pp. 235–238, Apr., 1994.

Flanagan, Berkley, and Shipley, "A Digital Teleconferencing System with Integrated Modalities for Human/Machine Communication; HuMaNet," ICASSP–91, Apr. 14–17, 1991.

Kobatake et al., "Super Directive Sensor Array with Neural Network Structure," ICASSP–92, Mar. 23–26, 1992.

Colnet et al., "Far Field Array Processing with Neural Networks," Apr. 19–22, 1994.

Farrell, Mammone, and Flanagan, "Beamforming Microphone Arrays for Speech Enhancement," ICASSP–92, Mar. 23–26 1992.

Thomas W. Parsons, "Voice and Speech Processing," McGraw–Hill, 1987, pp. 209, 372–374.

*Primary Examiner*—Allen R. MacDonald
*Assistant Examiner*—Donald L. Storm
*Attorney, Agent, or Firm*—Watov & Kipnes, P.C.

[57] ABSTRACT

A neural network is trained to transform distant-talking cepstrum coefficients, derived from a microphone array receiving speech from a speaker distant therefrom, into a form substantially similar to close-talking cepstrum coefficients that would be derived from a microphone close to the speaker, for providing robust hands-free speech and speaker recognition in adverse practical environments with existing speech and speaker recognition systems which have been trained on close-talking speech.

16 Claims, 17 Drawing Sheets

TIME IN SAMPLE NOS,

METHOD AND APPARATUS INCLUDING MICROPHONE ARRAYS AND NEURAL NETWORKS FOR SPEECH/SPEAKER RECOGNITION SYSTEMS

GOVERNMENT RIGHTS

This invention was made in part with Government support under ARPA Contract No. DABT63-93-C-0037, and in part under NSF Grant No. MIP-9121541. The Government has certain rights in this invention.

FIELD OF THE INVENTION

The present invention is generally related to speech and/or speaker recognition systems, and more particularly related to such systems for use in real-world environments where the speaker is at a distance from the sound pickup devices.

BACKGROUND OF THE INVENTION

Natural spoken language is a preferred means for human-to-human communication. Because of recent advances in automatic speech recognition, natural spoken language is emerging as an effective means for human-to-machine communication. The user is being liberated from manipulating a keyboard and mouse (which requires great hand/eye coordination). This hands-free advantage for speech recognition systems is particularly desired in situations where the speaker must be free to use his/her eyes and hands, and to move about unencumbered while talking.

However, the speaker is still encumbered in present systems by hand-held, body-worn, or tethered microphone equipment which captures sound signals and provides input to the speech recognizer. This is because most speech recognition systems work best with a close-talking microphone input, e.g. with the speaker and microphone in close proximity. When they are deployed in "real-world" environments, the performance of known speech recognition systems typically degrades. The degradation is particularly severe when the speaker is far from the microphone. Room reverberation and interfering noise contribute to the diminished performance.

There are several algorithms available for robust speech recognition in adverse acoustic environments. However, these algorithms are typically not useful where a speaker is a distance from a microphone (hereinafter referred to as distant-talking). Neither do they exploit improved sound capture methods for distant-talking. For example, a number of different microphones were used in an ARPA Spoke-5 test to study effects of channel variations. The microphone sensors were all positioned in the so-called near field (typically at a distance less than 20 inches from the speaker).

SUMMARY OF THE INVENTION

Most contemporary speech recognizer systems are designed to operate with close-talking speech, e.g. with the speaker close to the microphone or other sound pickup device. Such systems typically have the highest accuracy in recognizing speech or a speaker when used in a quiet laboratory. An object of this invention is to employ existing ARPA speech recognition technology in adverse "real-world" environments for distant-talking applications in a synergistic system. In one embodiment of the invention, a microphone array and a neural network (MANN) are included to mitigate environmental interference introduced by reverberation, ambient noise, and channel mismatch between training and testing conditions. The neural network is trained with simultaneously acquired speech signals from a microphone close to a speaker, and from a microphone array a distance from the speaker. The neural network transforms the cepstral coefficients of array speech to those corresponding to close-talking with which a speech or speaker recognition system has been trained. The MANN of the present invention has been proven to yield higher word recognition accuracy than other robust front end techniques, and is comparable to a retrained recognizer.

To evaluate the present MANN system, in another embodiment of the invention a distant-talking speech database is generated. The ARPA Resource Management (RM) corpus is played back through a high quality loudspeaker in a highly reverberant, hard-walled laboratory room. Three different microphone systems, positioned at various distances, are used to capture the signal. These microphones are an omnidirectional microphone, a Crown desk-stand microphone (PCC 160), and a wideband line array microphone. The database is referred to herein as RMdt.

Two sets of speech recognition experiments are conducted using the RMdt database. In both sets, an Entropic HTK V1.5 speech recognizer is utilized. The first set corresponds to matched training and testing conditions where the recognizer is retrained on a type of distant-talking speech and tested on the same type of distant-talking speech. The purpose of this set is to establish baseline results and compare recognition performance among the various microphones. In the second set, the recognizer is always trained on close-talking speech (originally trained) and tested on distant-talking speech (array, desk-mounted microphone, and omnidirectional microphone). The channel mismatch is accounted for by neural network computing. This latter set stands for the ultimate application scenario of present research. It has the advantage that retraining of existing automatic speech recognizers is not necessary. Such retraining is very time-consuming and expensive.

Robust speech recognition often subsumes techniques for speech enhancement, feature adaptation, and model adaptation. The present inventive MANN system inherently incorporates speech enhancement by use of a microphone array (MA), and feature adaptation by use of a neural network (NN). Preliminary experiments are performed in which model adaptation based on maximum a posteriori estimation of Hidden Markov Models (HMM) parameters is applied. The results are included for comparison. In addition, other algorithms for feature adaptation such as Signal-noise-ratio Dependent Cepstral Normalization (SDCN) has also been implemented and included in present experiments for comparative evaluation.

BRIEF DESCRIPTION OF THE DRAWINGS

Various embodiments of the present invention are shown and described below with reference to the drawings, in which like items are identified by the same reference designation, wherein.

DETAILED DESCRIPTION OF THE INVENTION

Figure 1:
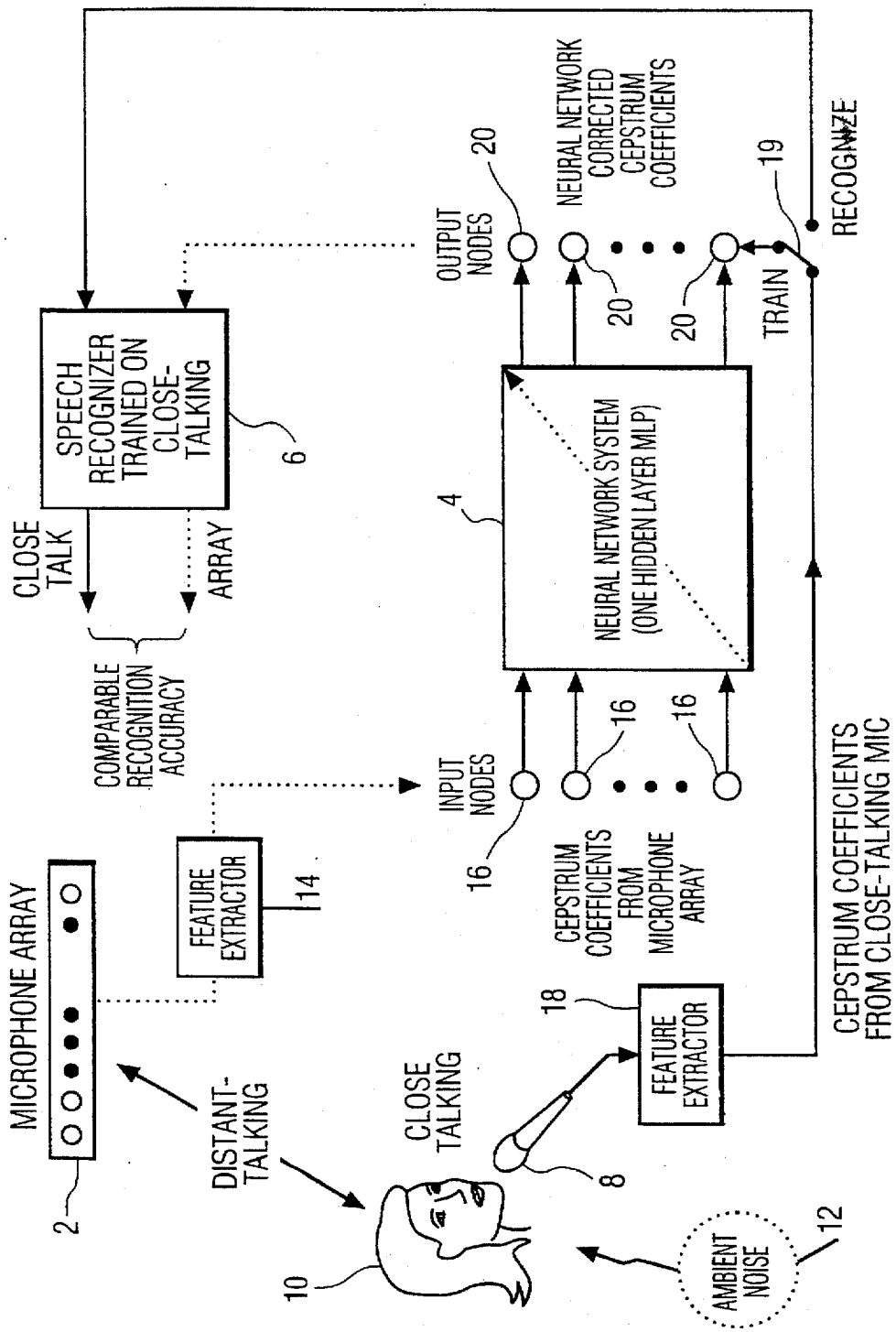
FIG. 1 is a block diagram of one embodiment of the invention for preprocessing speech signals provided to a speech and/or speaker recognition system.

In FIG. 1, the overall system design for robust speech recognition in variable acoustic environments, for one embodiment of the invention includes incorporating a microphone array (MA) 2, a neural network (NN) 4, and a speech recognizer 6 which has been trained on close-talking speech. The system also includes a microphone 8 which a speaker 10 speaks into from a distance of less than twenty inches (close-talking) during training of the NN 4. Assume that ambient noise 12 is present. A first feature extractor 14 extracts speech features or cepstrum coefficients from MA 2, and inputs the latter to input nodes 16 of NN 4 respectively. A second feature extractor 18 extracts cepstrum coefficients from the output of microphone 8, and inputs the latter to output nodes 20 of NN 4, as shown, during training of NN 4. The present invention achieves a recognition accuracy for a distant-talking speaker 10 in a noisy/reverberant environment which is comparable to that obtained in close-talking, quiet laboratories. To compensate for channel/environmental variations between training and testing of the recognizer 6, the NN 4 is used to transform the cepstrum coefficients from MA 2 (array speech) to those appropriate to close-talking so as to approximate matched training and testing conditions. After training, the transformed cepstrum coefficients from the output of NN 4 are provided as inputs to the speech recognizer 6.

Figure 8:
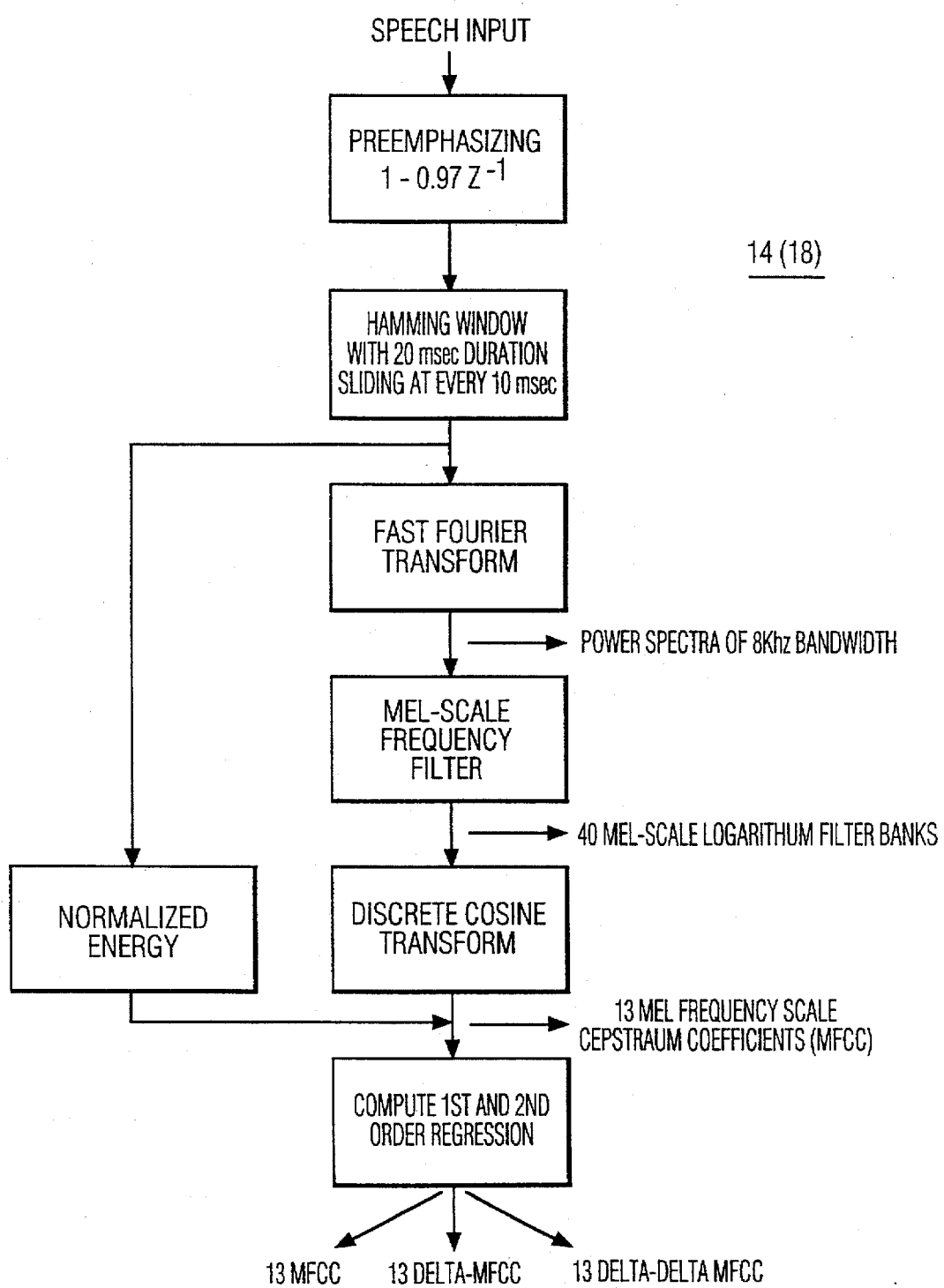
FIG. 8 is a flowchart showing the operation of a feature extractor of the prior art.

As shown in FIG. 1, in the preferred embodiment the simultaneous acquisition of close-talking and distant-talking speech is employed to train the NN processor 4, when switch 19 is operated to be in the training mode as shown. Note that after training, switch 19 is operated to move its switch arm to the "Recognize" mode, in which the output terminals of feature extractor 18 are disconnected from output nodes 20, and the latter connected to input terminals of speech recognizer 6, in this example. Also note that for purposes of simplicity of illustration, switch 19 is shown connected for switching only one output node 20. However, switch 19 is a gang switch or relay having a plurality of single-pole-double-throw switches for selectively switching the output nodes 20, respectively, between feature extractor 18 and speech recognizer 6, in this example. Through experimentation, it was determined that ten sentences of such adaptation speech suffices to train NN 4 for continuous speech recognition. For isolated speech recognition, an even smaller amount of speech is required for training NN 4. The feature extractors 14 and 18 are provided by known feature extractor networks. FIG. 8 shows a flowchart for the operation of the feature extractors 14 and 18.

The advantages of the present MANN system, that is of the combination of MA 2 and NN 4, are multiple, and can be summarized as follows. MANN avoids the necessity of retraining existing speech recognizers 6, and thereby enables direct deployment of the recognizers 6 in adverse "real-world" applications. The present MANN system also allows the user 10 to talk at a distance without being encumbered by hand-held, body worn, or tethered microphone equipment. Therefore, MANN can be used in Combat Information Centers, large-group conferencing, and in many hands busy, eyes busy tasks. Hands-free operation is also much appreciated for physically challenged persons. For each specific application, adapting the NN 4 requires substantially less speech data than training the speech recognizer 6.

Beamforming Microphone Arrays:

In the preferred embodiment of the invention, the MA 2 is a beamforming microphone array 2, as immediately described below.

For a point sound source of sinusoidal frequency f, the temporal variation of sound pressure at a distance r from the source is as follows:

$$p(r,t) = \frac{A}{r} e^{j2\pi f(t-r/c)} \tag{1}$$

where A is the source strength, and c is the speed of sound. From equation (1) it is clear that wave propagation has a spherical wavefront which can be assumed to be locally planar when r is relatively large. It can also be seen that the intensity of sound pressure decreases as the distance r increases, at a rate of 6 dB per octave in distance.

In an enclosure 3 (see FIG. 4), the pressure wave p(t,r) is reflected at surfaces of the sidewalls, ceiling, floor, and the objects inside (at an attenuated intensity dependent upon the absorption characteristics of the material). Reflected waves occur up to an infinite order theoretically and constitute the so called multipath distortion. Multipath distortion is the main determinant of the reverberation time of the enclosure. Room reverberation is generally independent of the source location. Therefore, as the distance between the microphone 8 and the talker 10 increases, the direct path signal from the source (speaker or user 10) becomes weaker and the environmental interference becomes more dominating. The interference includes both multipath distortion and background noise.

Figure 2:
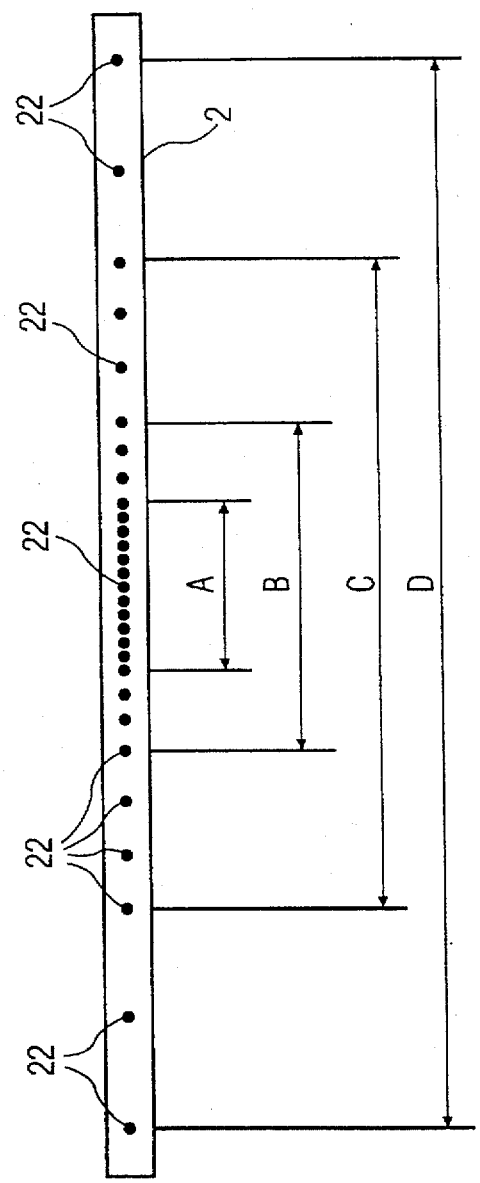
FIG. 2 is a front view of a beamforming line array of microphones for one embodiment of the invention.

Microphone array technology has been proven capable of capturing high quality sound signals in such unfavorable conditions. The microphone array 2 is a one-dimensional beamforming line array, in this example. It uses direct-path arrivals of speech to produce a single beam delay-and-sum beamformer. (The talker usually faces the center of the line array 2.) Beamforming arrays effectively combat reverberation and multipath distortion because the confined beam "sees" fewer sound images in reflecting surfaces. FIG. 2 depicts the front view of the array 2. The array consists of twenty-nine gradient sensors 22, which are nonuniformly positioned in a line (harmonically nested over four octaves). The array 2 is about 176 cm long, in this example. The four different spacing distances A, B, C, and D, respectively, between the sensors are 16, 8, 4, 2 cm, respectively. The useful frequency range, without any aliasing, is up to 7000 Hz. For each octave, thirteen microphones 22 are used, except for the lowest frequency octave for which there are only eleven microphones 22. By nesting the array 2, an approximately constant beamwidth for all frequencies of interest is attained. Furthermore, a nested array allows the sharing of microphone sensors 22 in different frequency octaves, thereby reducing the total number of microphones 22 needed (29 versus 13×4=52.)

The line array 2 does not take into account spherical spreading of a speech waveform radiated from the speaker's 10 mouth. It should be positioned distantly from the subject's 10 mouth where the wavefront is approximately planar. The spatial response of the array 2 is that of a figure-eight shape. Therefore, it also captures sound signals reflected at the back wall of the array 2.

Figure 3:
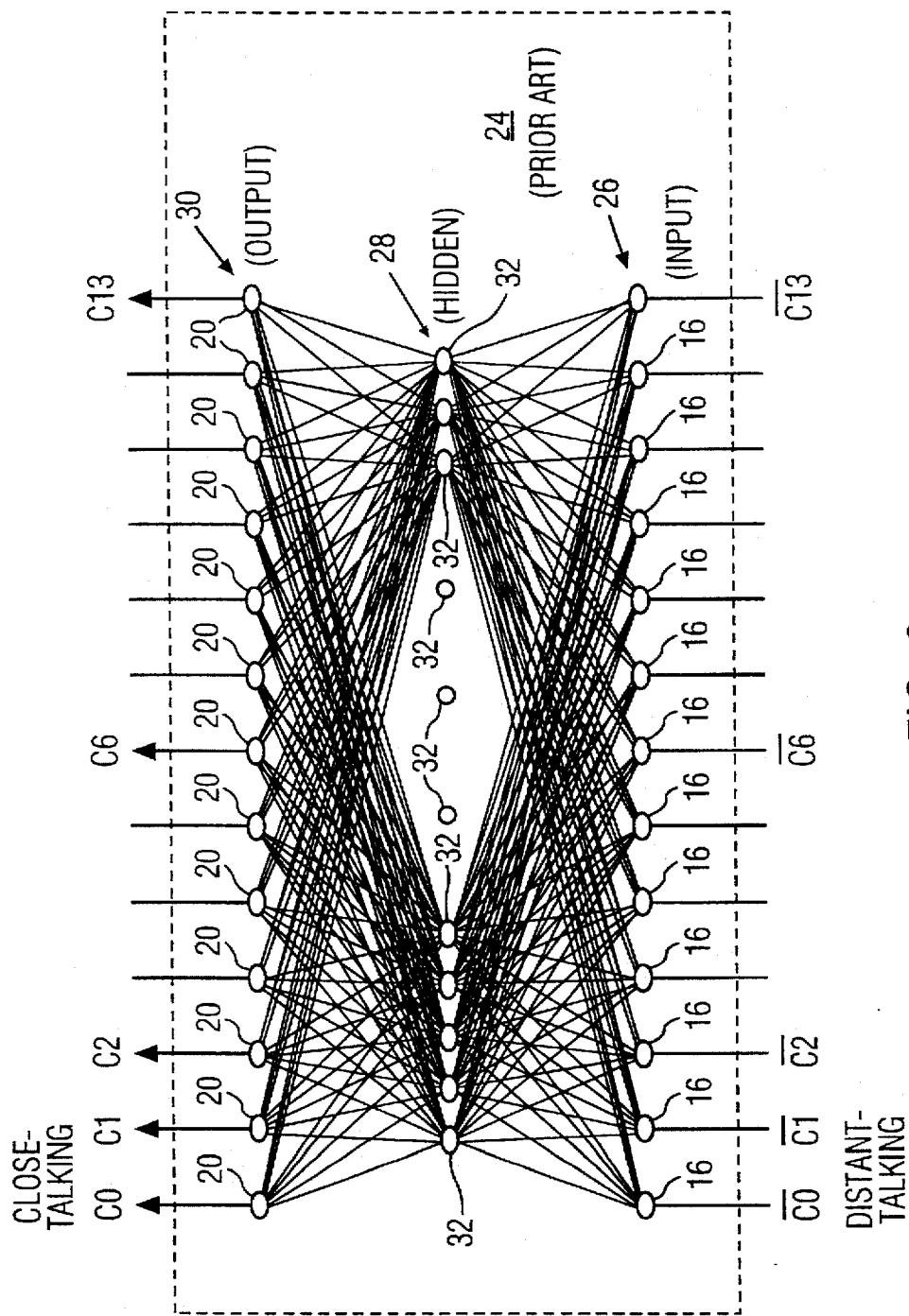
FIG. 3 is a pictorial diagram of a feed forward neural network (MLP) of the prior art for mapping cepstrum coefficients in various embodiments of the invention.

Neural Network Processors:

A NN processor 4 based on a multilayer perceptron (MLP) 24 is preferred for use in the present MANN system (see FIG. 3). The MLP 24 has three layers. The input 26 and output 28 layers have thirteen nodes each, 16, 20, respectively, with a node for each of the thirteen cepstrum coefficients used in the HTK speech recognizer 6. The number of hidden nodes 32 is varied over a wide range, from twenty to two hundred, to determine the optimal configuration. The neuron activation function of the hidden nodes 32 is a sigmoid function, and the activation function of the output layer 30 is a linear function. The input layer 26 incorporates a tapped delay line which allows simultaneous use of four previous frames. From transformed cepstrum coefficients, the corresponding delta and delta cepstrum coefficients can be readily calculated.

Figure 9:
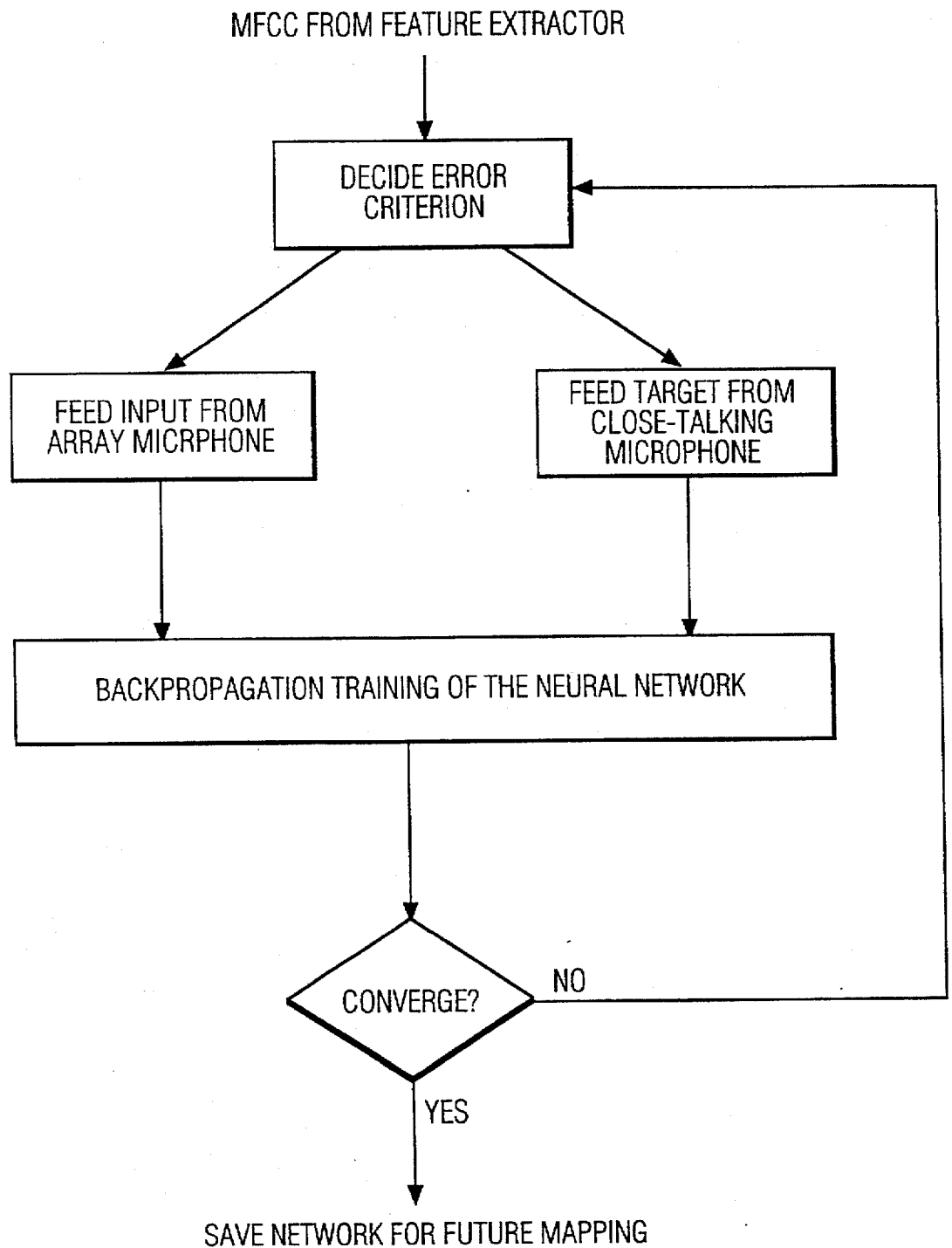
FIG. 9 shows a flowchart for a neural network training process for one embodiment of the invention.

The MLP 24 is fully connected, as shown in FIG. 3. The NN 4 is trained using a modified back propagation method to establish a mapping function of the cepstrum coefficients between distant-talking and close-talking. In the present example, the neural net 4 is trained in a speaker-dependent mode. The MLP 24 configuration in FIG. 3 is slightly different from that used for isolated-word recognition, where a separate neural network is designated to each of the cepstral coefficients used. A flowchart for an example of a training process for NN 4 is shown in FIG. 9.

Distant-Talking Corpus:

To evaluate the present MANN system for continuous distant-talking speech recognition, a speech corpus has been generated. The generation is accomplished via loudspeaker playback (Fostex) of the ARPA Resource Management database in a hard-walled laboratory room 3 (see FIG. 4). Therefore, the database is referred to as the distant-talking version of the ARPARM, RMdt. The sound signal is captured using the following four microphone systems (see FIG. 4): (i) beamforming line array microphone 2; (ii) desk-top microphones 33 (Crown PCC160); and (iii) single omnidirectional microphone 34.

Figure 4:
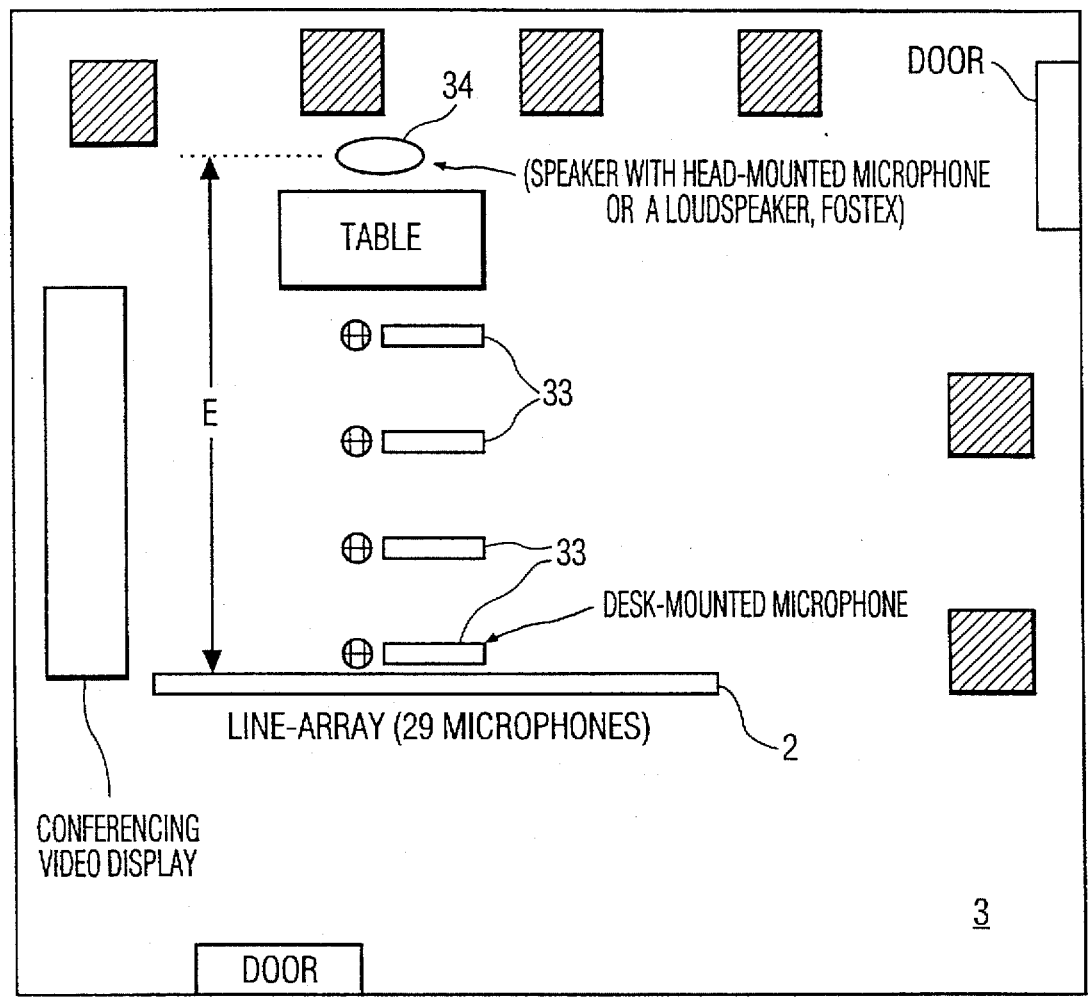
FIG. 4 shows a top view of a hard-walled laboratory room in which RMdt speech data was recorded in conducting experiments for various embodiments of the invention.

The recording environment is shown in FIG. 4. The reverberation time is approximately 0.5 second. The sound pressure level (SPL) of ambient noise is 50 dBA or 71 dBC, indicating an interfering noise spectrum more tense in lower audio frequencies. For the desk-mounted microphones 33 and the omnidirectional microphone 34, four distances are selected between the loudspeaker 34 and the sensor, as shown in FIG. 4. On the other hand, the line array 2 is always fixed at a distance E of twelve feet. Recall that the array 2 has a spatial response of a figure eight shape. Absorption material is attached to the array 2 to prevent pickup of the sound reflection from the back wall of the array 2. The recording is done with an Ariel ProPort with a sampling frequency of 16 kHz and 16-bit linear quantization. Note that in this example the hard walled room or enclosure 3 is six meters square.

Figure 5A:
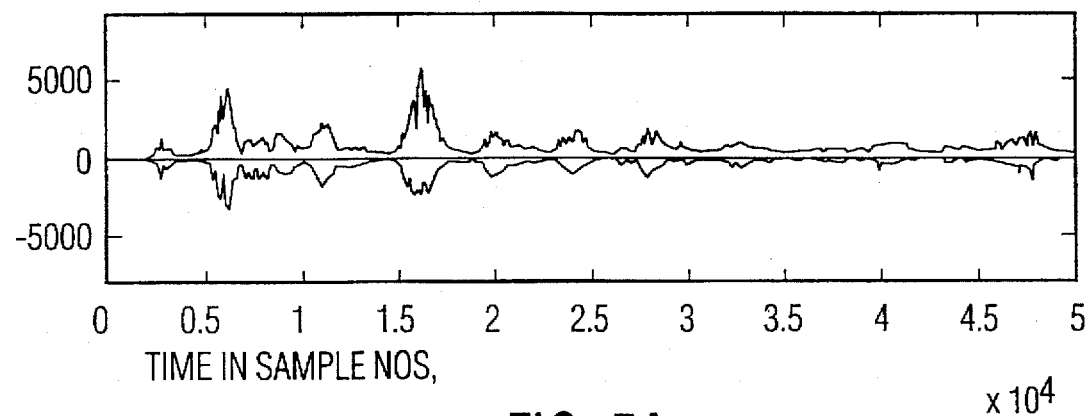
FIGS. 5(A), 5(B) and 5(C), shows samples of waveforms obtained from a microphone array for close-talking, and distant-talking, and obtained from a desk-mounted PCC microphone for distant-talking, respectively.
Figure 5B:
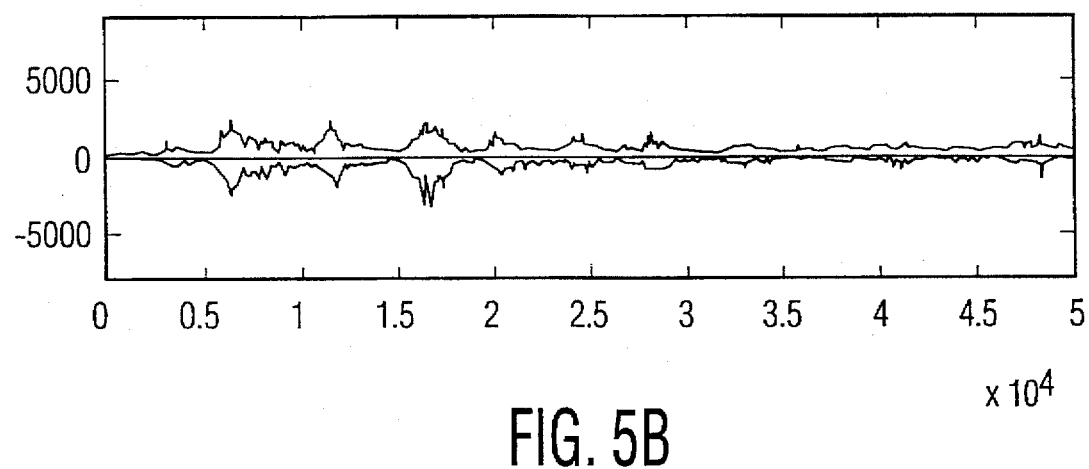
Figure 5C:
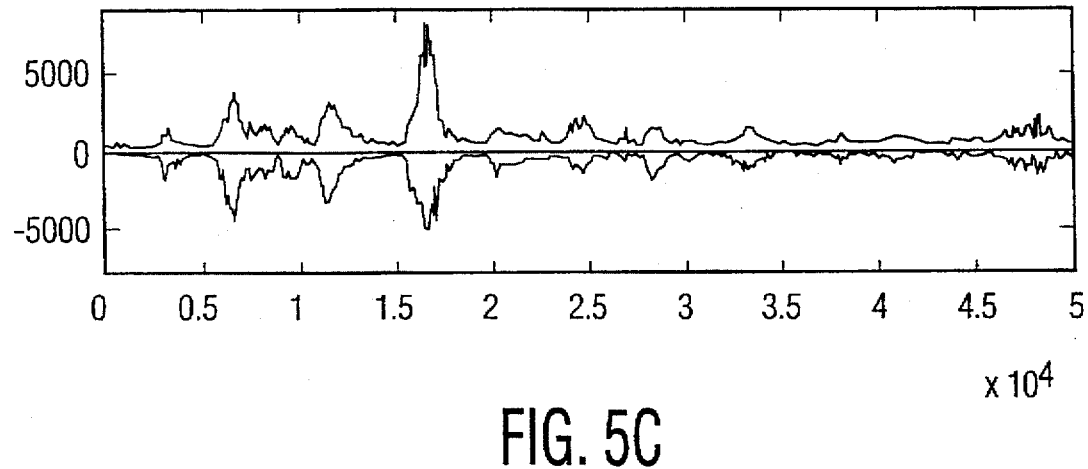

FIGS. 5A and 5B give examples of recorded speech waveform for close-talking and distant-talking (at a distance of twelve ft.), respectively. It can be seen that the array 2 preserves a good signal-to-noise dynamic range. FIG. 5C shows a recorded speech waveform for a desk mounted PCC microphone from distant talking.

Figure 10:
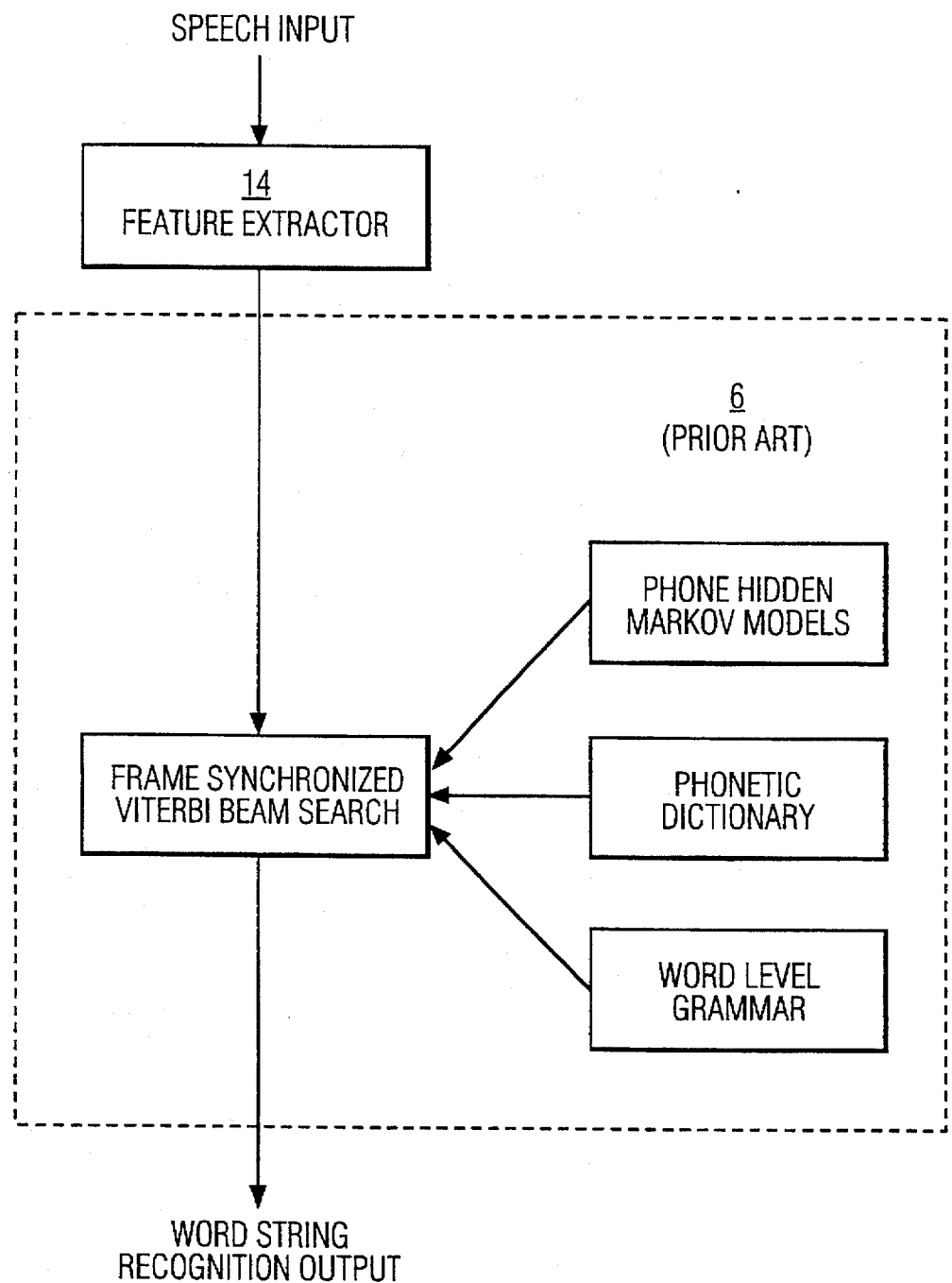
FIG. 10 shows a block diagram of a large vocabulary continuous speech recognition system of the prior art.
Figure 11:
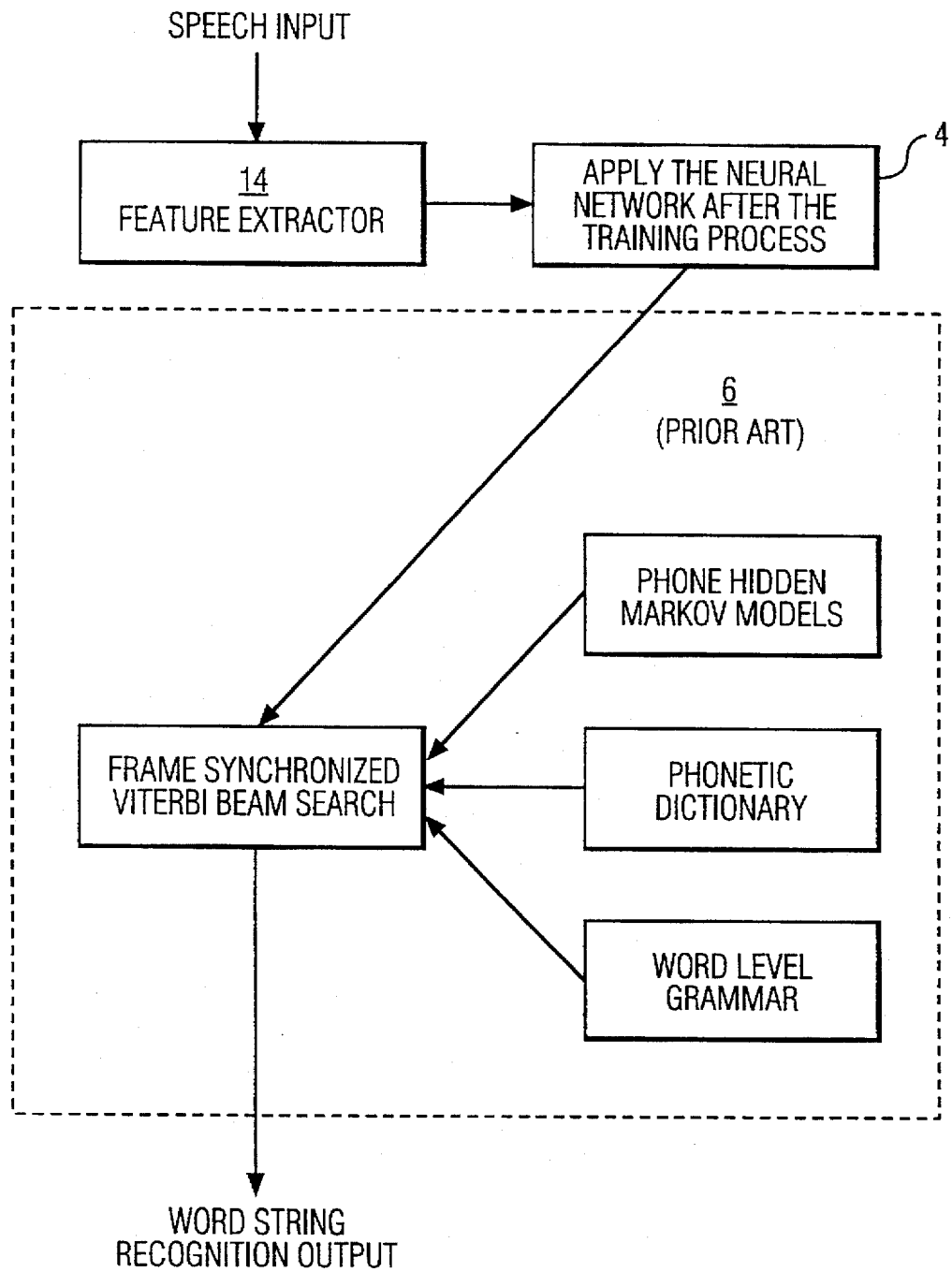
FIG. 11 shows the speech recognition system of FIG. 10 incorporating a neural network for one embodiment of the invention.

EXPERIMENTAL RESULTS:

Speech Recognizer:

Speech recognizer 6 is provided by known speech recognizers. An example of a known speech recognizer 6 is shown in FIG. 10 for a large vocabulary continuous speech recognition system. Use of this speech recognizer 6 with NN 4 for the purposes of this invention is shown in FIG. 11.

In the following recognition experiments, a known speech recognizer 6 is employed, in this example. The training portion of the recognizer 6 is available and hence, the recognizer 6 can be retrained when necessary. The recognizer 6 uses continuous-density triphone HMM models, in this example. The measured acoustic features consist of twelve lifted Mel Frequency Cepstrum Coefficients (MFCC) with mean removal, normalized energy, and their first and second derivatives computed using a 25-ms Hamming window moving every 10 ms. That is, the feature set has thirty-nine elements for each individual frame. The language model is always word-pair grammars.

When the recognizer 6 is retrained, all the ARPA RM1 7200 sentences from twelve speakers 16 are used as the training material (7 male and 5 female). During testing, 300 sentences from an ARPA Oct89 testset are used (twenty-five sentences per speaker).

Figure 6:
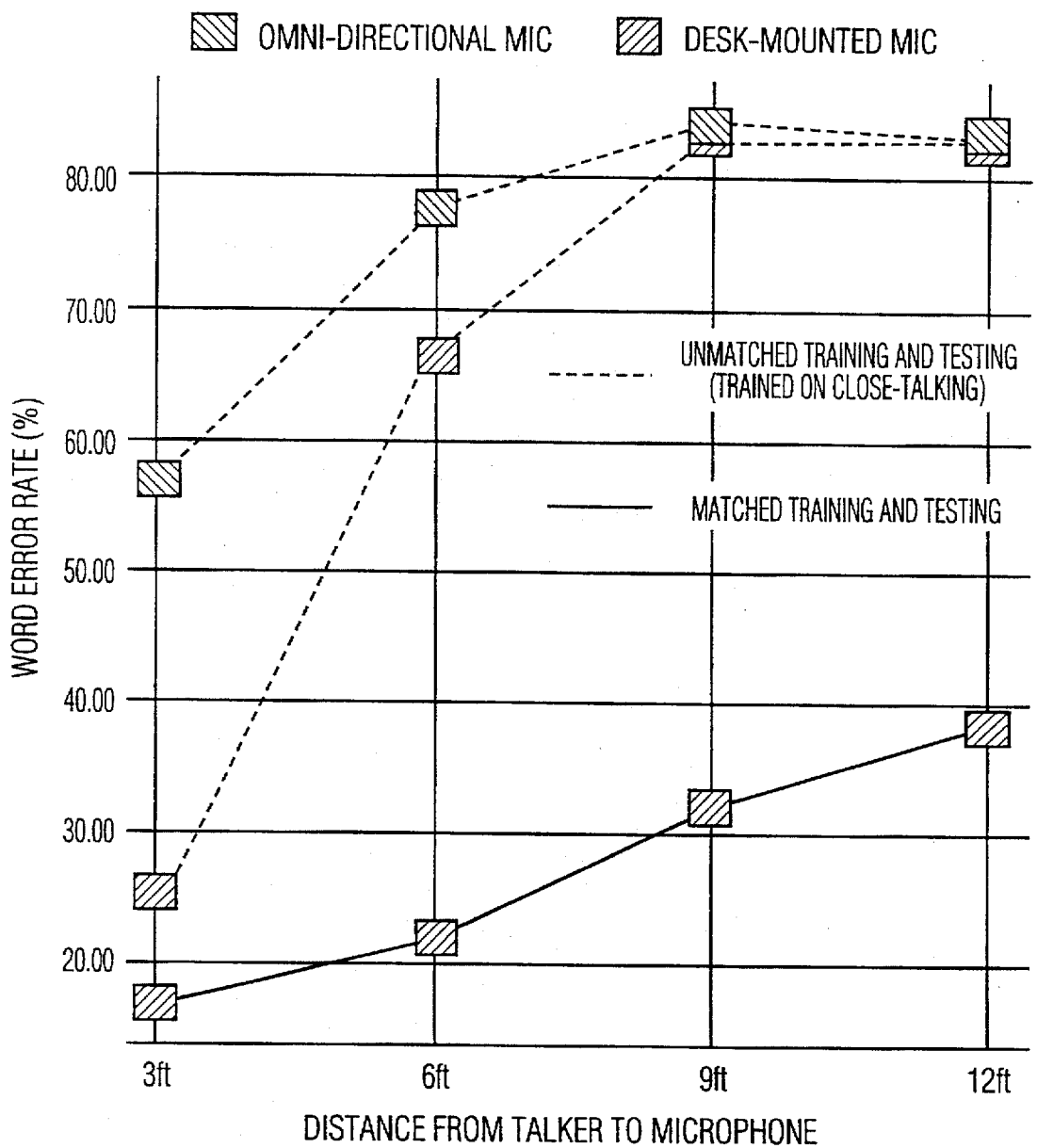
FIG. 6 is a chart showing word recognition error rates as a function of a distance between the source and the microphone, from experiments using a Triphone model speech recognizer with a Gaussian mixture per state.
Figure 7A:
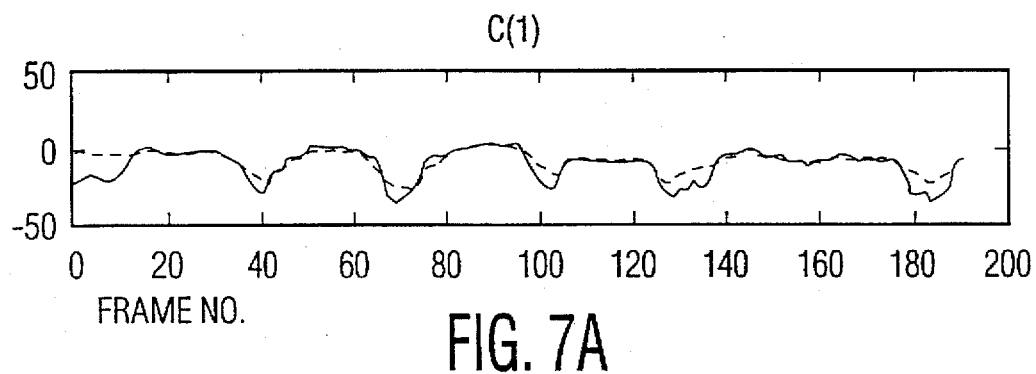
FIGS. 7A through 7D show trajectories of cepstrum coefficients, $C_1$, $C_2$, $C_3$, and $C_4$, as a comparison between close-talking and array speech, respectively.
Figure 7B:
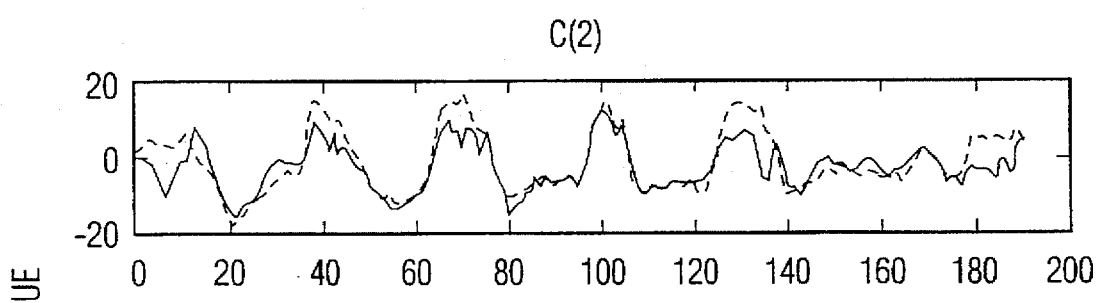
Figure 7C:
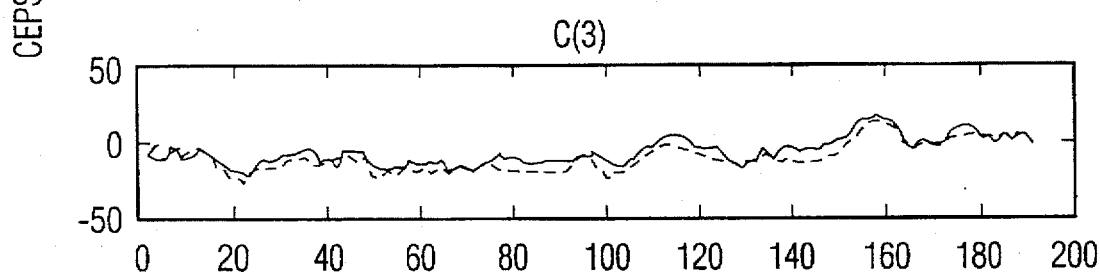
Figure 7D:
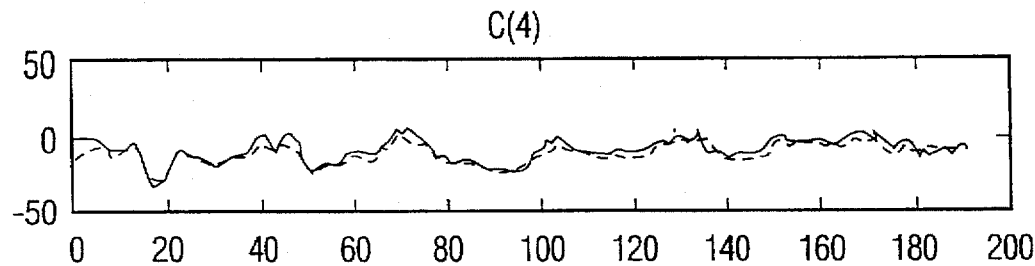
Figure 7E:
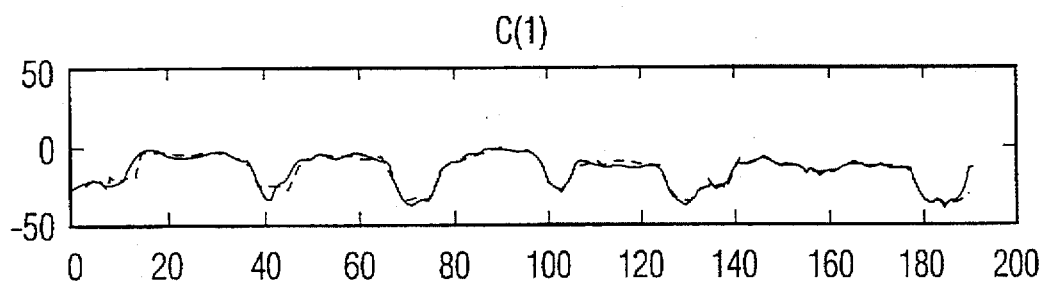
FIGS. 7E through 7H show trajectories of cepstrum coefficients, $C_1$, $C_2$, $C_3$, and $C_4$, as a comparison between close-talking and array speech with adaptation by use of a neural network, respectively, for one embodiment of the invention.
Figure 7F:
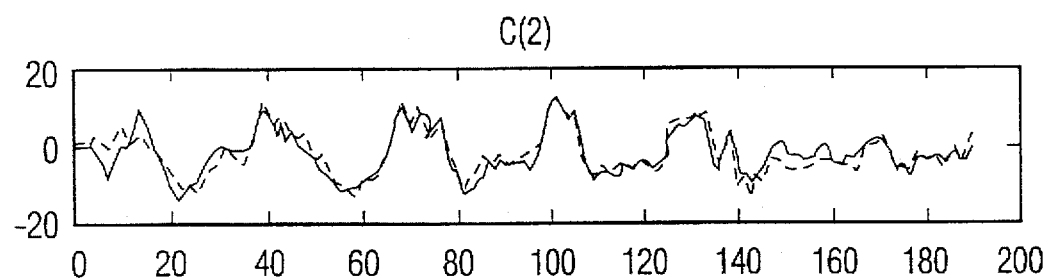
Figure 7G:
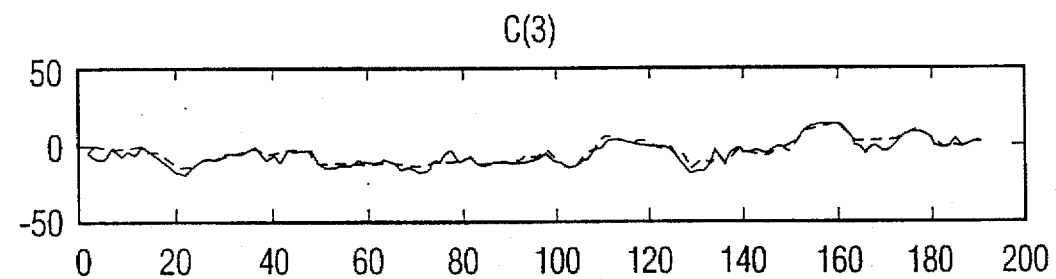
Figure 7H:
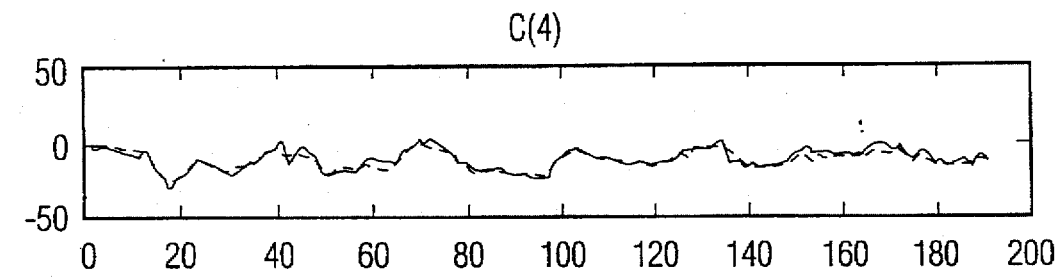

Effects of Distance:

FIG. 6 shows word recognition error rates as a function of the distance between the speaker 10 and the microphone 8. Results for both matched and unmatched training and testing are included. In the unmatched case, the speech recognizer 6 is trained on close-talking. It can be seen that a matched training/testing condition produces a much lower error rate than unmatched conditions, especially for a distance greater than three feet. The Crown PCC microphone is superior to the omnidirectional microphone when the distance is six feet and below. At larger distances, the two microphones provide a similar error rate. It should be pointed out that the playback volume is kept the same no matter where the microphone 8 is positioned. Background noise contributes to the rapid increase in the error rate when the microphones 8 are moved from three feet to six feet under the unmatched training and testing conditions. It should also be noted that detailed word error rates will be different for different acoustic environments.

Baseline Results:

In all experiments that follow, the distance between the source and the sensor is fixed at twelve feet. Table 1 gives the word recognition accuracy for three sound pickup systems. The recognizer 6 is retrained and then tested with three different types of speech on a rotating basis. As shown, under matched training/testing conditions, the performance of the array 2 in a reverberant environment is comparable to that of close-talking microphone in a quiet environment (87.7% versus 90.8%). Further, it can be observed that: When the recognizer 6 is trained on close-talking speech and tested on distant-talking speech, the recognition performance is poor, with the word accuracies decreasing from 90.8% to 56.8% to 34.9%. (see the 1st row of Table 1). The performance gain from 34.9% to 56.8% is maintained due to signal enhancement by microphone arrays 2. The gap between 56.8% to 90.8% will be substantially narrowed by feature adaptation to approximate a matched training/testing condition. When the recognizer is trained on desk-top microphone 33 speech and tested on array 2 speech, the recognition score is 80.3%. This word accuracy is comparable to that obtained under matched training/testing condition of speech captured by the desk-top microphone 8. When the recognizer 6 is trained on one type of distant-talking speech and tested on the other type of distant-talking speech, the recognition score is far better than tested on close-talking speech.

TABLE 1

| Training Microphone | Testing Microphone | | |
|---|---|---|---|
| | Close-talking | Desk-top | Line Array |
| Close-talking | 90.8 | 34.9 | 56.8 |
| Desk-top | 16.1 | 80.9 | 80.3 |
| Line Array | 50.2 | 74.5 | 87.7 |

Table 1 shows word recognition accuracies as a function of sound pickup systems. Numbers in boldface refer to the accuracy obtained under a matched training and testing condition.

Effects of NN 4 Compensation:

In the ARPA RM database, the twelve speakers 10 used each have a separate set of ten adaptation sentences, originally designed for speaker 10 adaptation experiments. These sentences are used to train speaker-dependent NN's 4. The trained NN's 4 are then used for feature adaptation to approximate a matched training and testing condition.

Effects of NN 4 feature adaptation are illustrated in Table 2, which gives both word correct and word accuracy in percentage. Two sets of results are presented. One is for an individual speaker 10, and the other is the average score of nine speakers 10. For one speaker 10, the relationships between the recognition performance and the number of hidden nodes 32 were studied. The number of nodes 32 in the hidden layer 28 is given inside parentheses. Table 2 shows that the array speech, without further processing, gives a word accuracy of 42.6% for this particular speaker 10. The incorporation of an MLP(NN 4) with twenty hidden nodes 32 elevates the number to 65%. The more the hidden nodes 32, the better is the recognition accuracy until it gets saturated when the hidden node 32 count is larger than one-hundred forty. However, the number of correctly recognized words still increases. For comparison, also include the result of Signal Noise Radio Dependent Normalization (SDCN). It is noticed that SDCN is comparable to the MLP with a hidden layer of forty nodes 32.

Table 2 shows word correct and word accuracy in percent with or without NN 4 compensation. The speech recognizer is always trained with close-talking speech unless explicitly specified. For comparison, results of SDCN and the speech recognizer retrained on array speech are included. Recognizer: Triphone models with three Gaussian mixtures per state. The number of testing words is one-hundred eighty-eight.

From Table 2, it is noticed that the present MANN system is comparable to retraining of the speech recognizer 6. For example, the nine speakers 10 have an averaged accuracy of 82.5% for the MANN system and 87.0% for the retraining.

TABLE 2

| One Speaker Condition | Word correct (%) | Word accuracy (%) |
|---|---|---|
| Close-talking | 95.7 | 95.7 |
| Line array (12 ft) | 58.0 | 42.6 |
| Array + NN (20) | 69.1 | 64.9 |
| Array + NN (40) | 72.8 | 69.7 |
| Array + NN (80) | 80.9 | 78.2 |
| Array + NN (120) | 803. | 79.3 |
| Array + NN (140) | 82.4 | 80.9 |
| Array + NN (200) | 84.6 | 80.9 |
| Array + retrain | 87.2 | 86.7 |
| Array + SDCN | 73.4 | 71.8 |

| 9 Speakers Condition | Averaged word correct (%) | Averaged word accuracy (%) |
|---|---|---|
| Close-talking | 95.6 | 94.2 |
| Line array (12 ft) | 54.5 | 37.3 |
| Array + NN (200) | 85.9 | 82.5 |
| Array + retrain | 88.4 | 87.0 |

In Table 3, sources of error are analyzed for an individual speaker. A direct use of array 2 speech as testing material produces a large number of substitutions and insertions. NN 4 compensation helps to drive down these two types of errors, but not the deletion error. These results are helpful to further increase the word accuracy by more detailed language modeling and by more comprehensive NNs.

TABLE 3

| CONDITION | # Corr. | # Del. | # Subs. | # Ins. |
|---|---|---|---|---|
| Close-talking | 180 | 4 | 4 | 0 |
| Line array (12 ft) | 109 | 9 | 70 | 29 |
| Array + NN (20) | 130 | 14 | 44 | 8 |
| Array + NN (40) | 137 | 10 | 41 | 6 |
| Array + NN (80) | 152 | 12 | 24 | 5 |
| Array + NN (120) | 151 | 13 | 24 | 2 |
| Array + NN (140) | 155 | 11 | 22 | 3 |
| Array + NN (200) | 159 | 10 | 19 | 7 |
| Array + retrain | 164 | 11 | 13 | 1 |
| Array + SDCN | 138 | 15 | 35 | 3 |

Table 3 shows Distribution of errors.

FIG. 7A through 7D plot trajectories of cepstrum coefficients $C_1$–$C_4$, respectively, for comparing close-talking and array speech. FIGS. 7E through 7H plot trajectories of cepstrum coefficients for comparing close-talking and array speech with adaptation by use of NN 4. A visual comparison reveals that NN 4 processing succeeds in mapping the cepstrum coefficients of array speech to those of close-talking speech.

Model Adaptation using MAP:

NN 4 transforms cepstrum coefficients from the array 2 speech to those of close-talking. Preliminary experiments were conducted to adapt parameters of HMM models, originally estimated from close-talking, to those corresponding to distant-talking array. In this example, such model adaptation is based on Maximum A Posteriori (MAP) estimations. The improvement in recognition performance by MAP is shown in Table 4. It is important to note that monophone HMMs are used in this experiment, which typically has a lower word accuracy than triphone models.

TABLE 4

|  | Close-talking | Desktop | Array |
| --- | --- | --- | --- |
| No compensation | 75.7 | 17.8 | 31.2 |
| MAP | — | 36.3 | 51.1 |

Table 4 shows word recognition accuracy with or without MAP estimation of HMM parameters. Monophone models with three HMM states per model and one Gaussian mixture per state were used in this example for speech recognizer 6.

The above-described experiments on distant-talking speech recognition primarily with the present inventive MANN system, and supplemented by MAP techniques, show that the array 2 outperforms the desk-mounted directional microphone 33, in spite of the fact that only a simple array 2 was employed in the experiments. The results also indicate that NN's 4 are effective in compensating channel/environmental variations between training and testing and thereby elevate word recognition accuracies. As shown in Table 2, the present MANN yields an averaged word accuracy of 82.5%. The performance is comparable to that obtained with a retrained speech recognizer (87.0%), but retraining speech recognizers 6 is expensive and is necessitated for each specific application tasks. However, the present MANN invention enables direct deployment of existing speech recognizers in variable acoustic environments and NN 4 adaptation requires only a small amount of speech material.

In alternative embodiments of the invention, multiple neural networks 4, each designated for a particular location in an enclosure, may be used to handle a moving talker 10. Also, more sophisticated microphone arrays 2 with signal processing for matched-filtering, multiple beamforming, and automatic source location, may be used.

Speaker Identification Embodiment:

Speaker identification, verification, and classification are three aspects of speaker recognition. The task of speaker identification is to automatically determine whether an utterance has been spoken by one of a training population of speakers 10 and to identify the talker or speaker 10. If the speaker 10 is known to be represented in the population, the identification is from a "closed set". If not, it is from an "open set".

Speaker recognition is typically divided into two subclasses, according to text dependency: text dependent, and text independent, respectively. In the text-dependent mode, speakers 10 provide utterances of the same text for both training and testing. A classical approach to text-dependent speaker recognition is template matching or pattern recognition, where dynamic-time-warping methods are usually applied to temporally align the training and testing utterances. Further, due to the same sequence of phonetic events, dynamic characteristics of spectra, such as delta cepstrum, are often included in the feature representation to improve performance. On the other hand, text-independent speaker recognition does not impose the constraint of the same text in training and recognition trials. Consequently, text-independent speaker recognition techniques are primarily based on measurements having no reference to a timing index, and hence, dynamic attributes of spectra may not be fully exploited.

Figure 12:
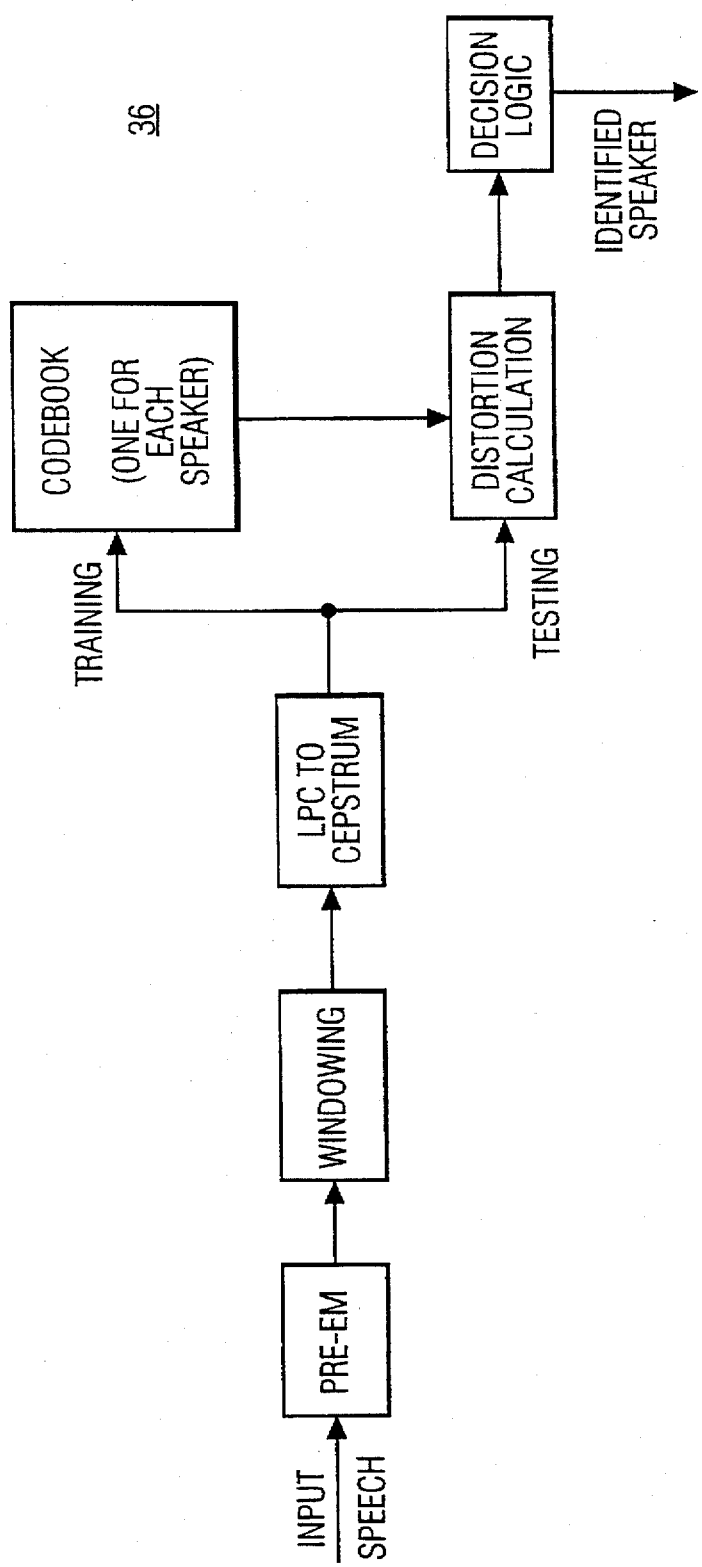
FIG. 12 shows a block diagram of a vector-quantization based speaker identification system.

In this embodiment, a closed-set, text-independent speaker identification system is developed. The system uses LPC-derived cepstrum coefficients as the measured features and follows speaker-based vector quantization (VQ) approaches (see FIG. 12). The vector quantizer adopted in this study is the Learning Vector Quantization (LVQ).

During training sessions, the input speech signal is pre-emphasized and segmented into frames. Those frames whose short-time energy is less than a preset threshold (based on the maximum short-time energy of the whole sentence) are disregarded. The remaining frames are Hamming-windowed, and LPC-analyzed, resulting in a sequence of vectors of LPC-derived cepstrum coefficients. The resultant cepstrum vectors are vector-quantized, with one codebook for each individual speaker. During testing trials, corresponding cepstrum coefficients of the test sentence are computed. The following distance, with respect to the ith codebook, is then determined:

$$D^{(i)} = \frac{1}{L} \sum_{l=1}^{L} \min_{1 \leq m \leq M} \left\{ \sum_{n=1}^{q} [c(l,n) - C_i(m,n)]^2 \right\}, \quad (2)$$

where M is the number of codebook entries, L is the number of frames in a test sentence, $c(l,n)$ is the cepstrum-coefficient vector of the sentence at the frame l, $C_i(m,n)$ is the cepstrum vector of the mth centroid of the ith codebook, and q is the order of cepstrum coefficients. The zeroth-order cepstrum coefficient, which is a measure of gain, is not used in Eq. (2). The final speaker identification decision is given by:

$$i^* = \text{argmin } D^{(i)}, \text{ for } 1 \leq i \leq I \quad (3)$$

where I is the total number of speakers in the closed set.

Figure 13:
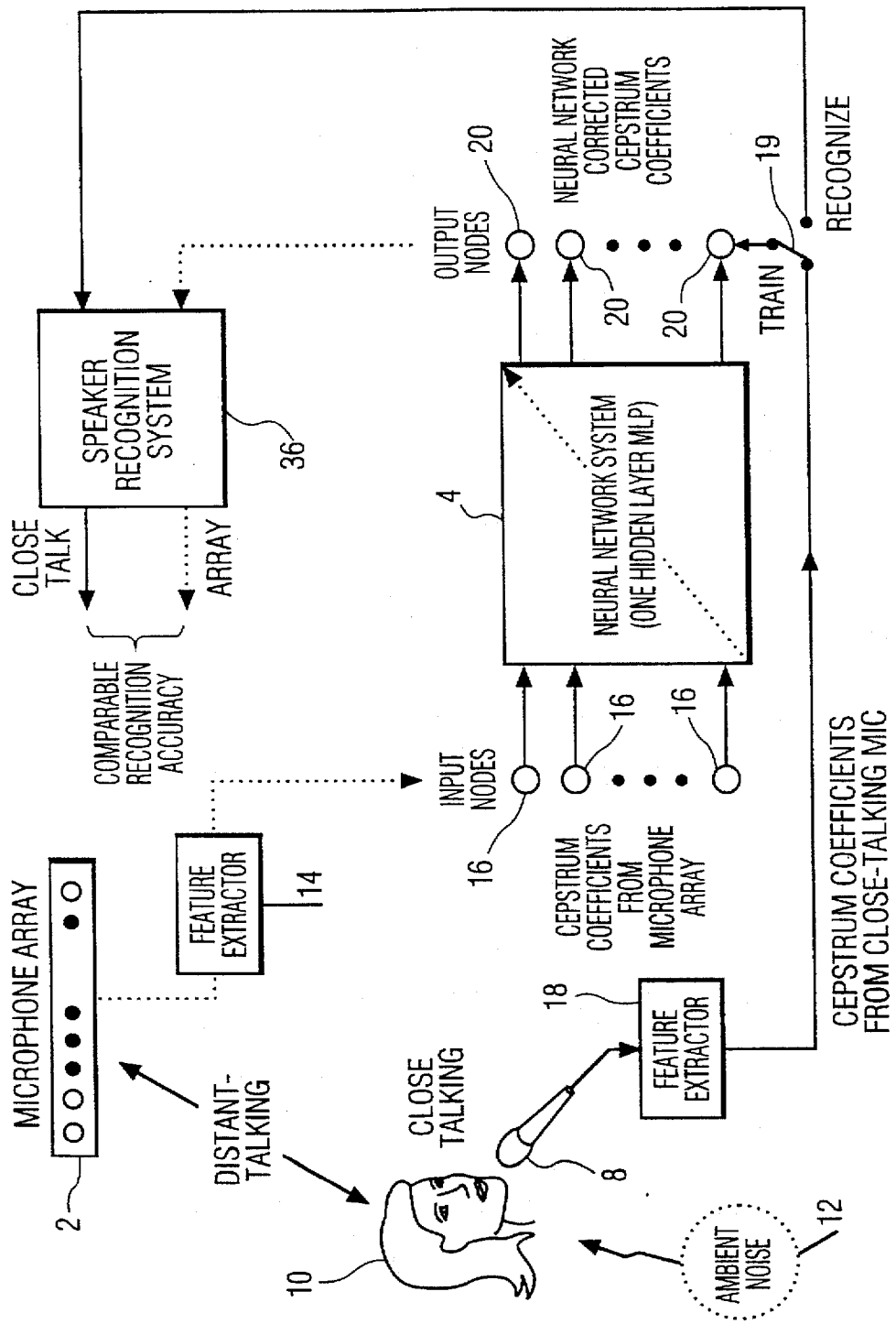
FIG. 13 shows a block diagram of a speech preprocessor as used in another embodiment of the invention for a speaker identification system.

The MANN System For Speaker Identification:

FIG. 13 schematically shows the overall system design of MANN for robust speaker recognition. As with the previous speech recognition embodiment, the MANN system is typically used when the recognition system is trained with close-talking microphone 8 input and is tested with reverberant microphone-array 2 input, i.e., an unmatched training/testing condition. For speaker identification applications, the MANN system operates as follows.

First, a simultaneous recording with the close-talking microphone 8 and with the microphone array 2 is needed to train the neural network processor 4 (NN 4). Typically, ten second stereo speech material is sufficient. LPC-derived cepstrum coefficients of the close-talking microphone 8 input and array 2 input are then calculated and used as the target output and the input of the NN 4, respectively, to train the neural network 4.

Figure 14:
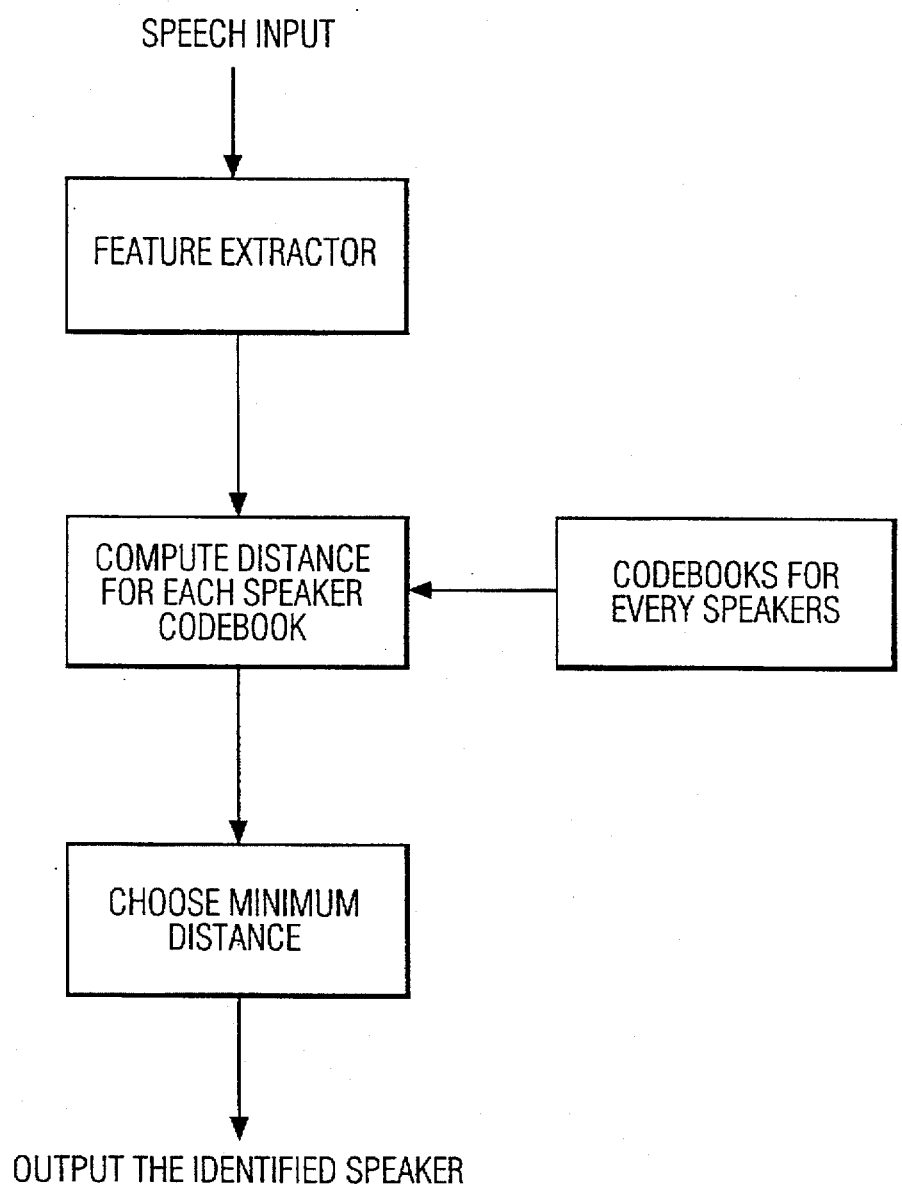
FIG. 14 shows a simplified flowchart for a speaker identification system of the prior art.

The trained neural network 4 is then used to transform cepstrum coefficients of the array input to those corresponding to the close-talking microphone 8 input. The transformed cepstrum coefficients are the input to the speaker identification system 36. The speaker identification system 36 can be provided by the prior system of FIG. 12. A flowchart for another prior speaker identification system to provide 36 is shown in FIG. 14. Because of the good sound quality of the microphone array 2 and the feature adaptation of the neural network 4, speaker identification performance can be elevated for the unmatched training and testing condition. For experiments under matched training/testing conditions, the NN 4 adaptation is not necessary.

The neural network 4 is a fully-connected multi-layer perception (MLP), in this example. The MLP has three layers 26, 28 and 30, as previously described for FIG. 3. The activation function at the output layer 30 is linear. The neural network 4 is speaker-dependently trained using a back propagation algorithm. Note that the MLP configuration is similar to but simpler than that used in speech recognition.

Generation of Degraded Speech:

The MANN and speaker identification system is evaluated using computer generated reverberant speech, and real room speech. Dimensions of the simulated enclosure are 20*16*5 m. The acoustic absorption coefficient for all walls is set to 0.1, producing a highly reverberant enclosure. The reverberation time of the enclosure is approximately 1.6 seconds. Room acoustics is simulated based on the image technique of computing source-receiver impulse responses. Images up to fifth order are included in generating the reverberant speech. Speech input to the room simulation is a signal source placed at coordinates (14,9.5,1.7) m. The New England subset of the TIMIT database is used as the source (close-talking speech).

In addition to the speech source, inputs to the room simulation may include a competing noise source of variable intensity, to produce different signal-to-competing-noise ratios (SCNR's). The SCNR is the ratio of signal power to competing noise power, neglecting multipath distortion. By this definition, signal-to-noise ratio (SNR) of the captured sound is lower than SCNR. The noise is either a Gaussian random number sequence, generated with different seeds, or speech of another person. The competing noise is located at (3.0,5.0,1.0) m.

The degraded speech is then captured by the following four microphone systems:

I. Single microphone system. A single microphone receiver is located at (10,0.5,1.7) m. The overall system impulse response is simply the impulse response from the source to the receiver. The microphone is an omni-directional pressure sensor.

II. One beamforming array. A single-beam line array is placed 0.5 meter off the wall with its center located at (10,0.5,1.7) m. The array consists of 51 microphones with uniform separation of 4 cm. This spacing provides selectivity without spatial aliasing for frequencies up to 4000 Hz. The impulse response from the source to each receiver is calculated from the room geometry. The direct path-arrivals of the impulse responses are used to produce a single-beam delay-and-sum beamformer.

III. Two beamforming arrays. Two orthogonal line arrays are placed 0.5 meter off the walls with their centers at (10,0.5,1.7)~m and (0.5,8.0,1.7)~m, respectively.

IV. Matched-filter arrays. Two 31×31 matched-filter arrays are placed on orthogonal walls. Centers of the arrays are at (10,0,1,7) m and (0,8,1.7) m, respectively. Separation of microphone elements is again 4 cm.

Note that in the above positioning, the noise source is closer to the microphone sensors than is the speech (signal) source. This unfavorable positioning typically results in an even lower SNR at a specified SCNR.

Results For Matched Conditions of Training and Testing:

Speaker identification results are presented below for matched training/testing conditions; that is, the speaker identification system is trained and tested using the same type of speech input. Results for unmatched conditions of training and testing, with or without neural network 4 equalization, are given in the next section.

Speech material:

As mentioned earlier, the New England subset of the TIMIT speech database is used as the source input to the computer model of room 3 acoustics. This subset comprises twenty-four male speakers 10 and fourteen females. The TIMIT data are divided into a training set and a testing set. The training set for each speaker 10 comprises ten sentences, and these sentences are used for the present evaluation. The first five sentences are concatenated and used as training data for the speaker identification. The purpose of concatenation is to have more speech material to train the codebook. The remaining five sentences are used to test the speaker identification. Thus, the total number of trials is one-hundred ninety (5*38). The TIMIT data are low-pass filtered to 4 kHz and down sampled at 8 kHz, to be representative of telephone bandwidth. This low-pass version of the TIMIT data is referred to as close-talking speech in the following discussion.

In the present embodiment, the orders of LPC analysis and cepstrum coefficients are both set to twelve, the number of codebook entries is set to forty-three, the length of Hamming window is equal to 15 ms, and the window is shifted in time every 7.5 ms.

Figure 15:
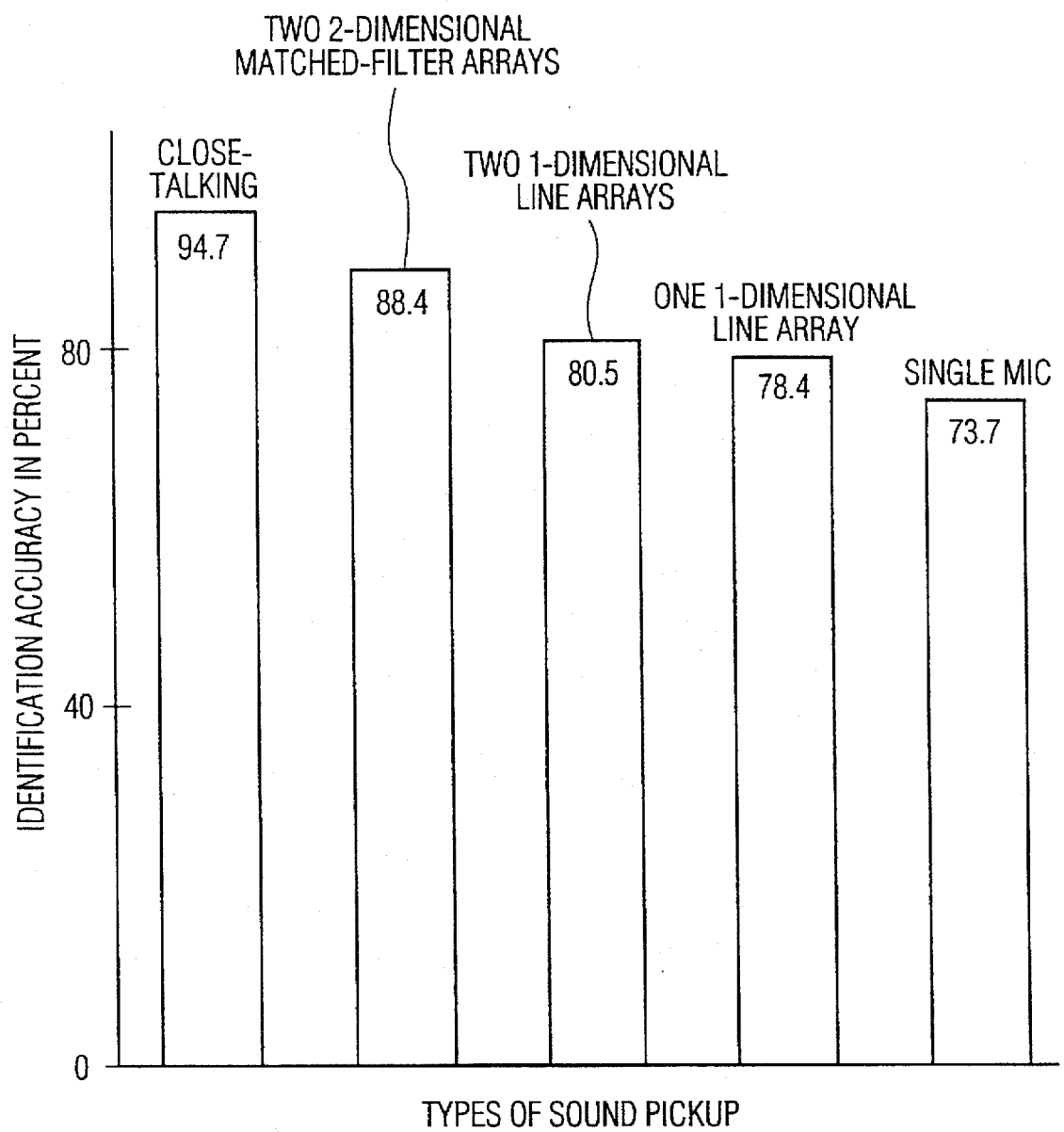
FIG. 15 shows a chart of identification accuracy in percent versus various types of sound pick up apparatus as used in a speaker identification system under matched training/testing conditions, in the absence of a competing noise source, and under conditions where no silence removal is made for reverberant speech.

Effect of Reverberation and Noise:

FIG. 15 gives results of speaker identification for close-talking speech and distant-talking reverberant speech captured by the four different microphone systems previously described. In this experiment, there is no competing noise and the corresponding SCNR is infinite.

As can be expected, close-talking speech gives the highest identification score 94.7%, followed by the reverberant speech captured by matched-filter arrays, 88.4%. The use of two one-dimensional line arrays increases the score by 2%, compared with that of one line array 78.4%. The single omnidirectional microphone gives the poorest result at 73.7%. It is important to note that the threshold used for silence removal in FIG. 15 is set to 1% of the maximum frame-energy. This value is essentially too low to eliminate any frames of the reverberant speech signals. When the threshold is increased to 2.5%, the matched-filter arrays gave an identification accuracy as high as 91%.

TABLE 5

| SPEAKER I.D | Competing Noise | | | | | | |
|---|---|---|---|---|---|---|---|
| ERROR RATE | No. | Const. Noise | | | Varying Noise | | Sp |
| SCNR (dB) | ∞ | 20 | 10 | 0 | 20 | 10 | 0 | 0 |
| 1 Single mic | 26 | 37 | 50 | 80 | 53 | 65 | 85 | 49 |
| 1 beamforming | 22 | — | — | — | 47 | 37 | 64 | 28 |
| 2 beamforming | 19 | — | — | — | 40 | 45 | 57 | 24 |
| 2 matched-filter | 12 | 12 | 13 | 14 | 22 | 18 | 20 | 12 |

Table 5 illustrates effects on type and level of competing noise on speaker identification. Three different values of interfering noise SCNR'S are assumed, 20, 10, and 0 dB for two types of Gaussian noise. Reverberation (multipath) distortion dominates performance when the competing noise interference is reduced to a low level. Also, note that in the simulated experiments, characteristic changes in articulation due to environmental influence, known as the Lombard effect, have not been accounted for. The first type corresponds to identical noise interference for all sentences, and the second one corresponds to different noise interference for different sentences (by varying the seed of the random number generation). In addition, speech of another person is also used as interfering noise at SCNR=0 dB, which is denoted by Sp in Table 5.

The power of matched-filter microphone arrays 2 is their capability for combating noise sources simultaneously present in the room. This capability stems from the selectivity in spatial volume, and is corroborated by the results in Table 5. The error rate of the matched-filter arrays 2 remains almost unchanged as the SCNR decreases, while the error rate of the single microphone system substantially increases. (The observed small fluctuation of the matched-filter arrays 2 is not statistically significant.) The error rates of the line beamforming arrays also increase as the SCNR decreases, but to a less extent than the single microphone system.

Table 5 shows that a varying noise signal produces more interference than a constant noise signal. It also shows that the identification performance is less affected by speech of another person than by a Gaussian noise at the same SCNR.

Results for Unmatched Conditions of Training and Testing:

No NN equalization:

TABLE 6

| SPEAKER I.D. ERROR RATE | Const. Noise | | | Varying Noise | | | Sp |
|---|---|---|---|---|---|---|---|
| SCNR (dB) | 20 | 10 | 0 | 20 | 10 | 0 | 0 |
| 1 Single mic | 71 | 93 | 96 | 72 | 92 | 97 | 74 |
| 1 beamforming | — | — | — | 53 | 80 | 91 | 60 |
| 2 beamforming | — | — | — | 45 | 61 | 85 | 47 |
| 2 matched-filter | 20 | 20 | 37 | 19 | 25 | 40 | 27 |

When the target application condition (testing condition) differs from that in which the speaker identification system has been trained, performance of speaker identification is typically degraded. Table 6 shows results under unmatched training and testing conditions, where the speaker identification system has been trained using the close-talking speech and tested with reverberant speech. During the training, no silence frames are removed because it is difficult to remove corresponding silence segments of reverberant distant-talking speech.

It can be seen that matched-filter arrays 2, again, perform significantly better than a single microphone. At SCNR<=10 dB, the identification accuracy for the single receiver is around the chance level, i.e., one out of thirty-eight speakers 10. However, the overall performance of matched-filter array microphones 2 under unmatched conditions is not good enough to be used practically. For a constant seed of Gaussian noise, the error rate for matched-filter arrays in Table 6 is about 20% when SCNR>=10 dB, and jumps to 38% when SCNR=0 dB. The trend is similar for a varying seed of Gaussian noise. The results are much poorer than the corresponding ones in Table 5. For instance, when another's speech is used as interfering noise, the error rates are 12% and 27% for the matched and unmatched training/testing conditions, respectively.

With NN equalization:

To improve identification results under unmatched training/testing conditions, a neural network equalizer 4 is utilized to adapt the testing condition to the training condition so that a matched training/testing condition is approximated. The adaptation is accomplished by transforming cepstral coefficients of array inputs to those of close-talking speech, after the NN 4 has learned the environmental characteristics.

TABLE 7

| SPEAKER I.D. ERROR RATE | SCNR of Varying Competing Noise | | |
|---|---|---|---|
| Mic. Type | ∞ | 20 dB | 0 dB |
| 1 Single mic | — | 49 (72) | 85 (97) |
| 1 beamforming | 9 (44) | 16 (53) | 54 (91) |
| 2 matched-filter | 6 (20) | 10 (19) | 9 (40) |

The advantage of the NN 4 in correcting mismatch between the training and the testing condition can be seen in Table 7. In the case of matched-filter arrays, use of the NN 4 reduces the error rate from about 20% to 6% for SCNR=infinite dB, from 19% to 10% for SCNR=20 dB, and from 40% to 9% for SCNR=0 dB. In fact, Table 7 shows that the NN equalizer 4 reduces the identification error rate for all kinds of microphones and different SCNR's. The results demonstrate the capability of NN's 4 for learning and compensating for environmental interference. It is noticed, however, that for an extremely impaired signal, such as the reverberant signal captured by the single microphone system at SCNR=0 dB, the improvement by NN 4 is marginal (from 97% to 85%).

As seen in FIG. 15, the error rate at SCNR=infinite and under a matched training/testing condition is 12% for matched-filter arrays, and 22% for one 1-Dimensional line array. The corresponding error rates under an unmatched training/testing condition but with NN 4 equalization, are 6% and 9%, respectively, as can be seen Table 7. That is, the identification error rate for an unmatched training/testing condition with the NN 4 equalization, is lower than that for a matched training and testing condition. (Recall that for a matched training/testing condition no NN 4 equalizers are applied.) By comparing Tables 7 and 8, similar results are also seen for other experimental conditions. In the case of SCNR=20 dB (varying noise), for instance, the error rate for the matched-filter arrays 2 under the matched training/testing condition are 22%. The corresponding error rate under the unmatched training/testing condition but corrected by NN 4 are 10%. The NN 4 equalization lowers the error rate by some 50%.

Conclusions:

In the above description, the inventors examined as a function of different sound capture systems, the effects of room reverberation and competing noise on the performance of a speaker identification embodiment. It was found that two 2 D matched-filter microphone arrays, orthogonally placed, are capable of producing high "hands-free" identification scores, even under hostile conditions of reverberation, and low SCNR's caused by interfering noise. It was also found that the NN 4 can effectively learn and compensate for deleterious properties of the acoustic environment. The use of NN 4 improves performance of speaker identification under unmatched training/testing conditions. The present data suggest that the improved identification accuracy can be better than the corresponding one under matched training/testing conditions but with no NN 4 processors applied, and can be comparable to the accuracy obtained from close-talking speech. As shown for the first embodiment of the invention, similar results were obtained for speech recognition.

The results show that the MANN system, particularly the system of matched-filter array microphones 2 and neural networks 4, can be used as robust preprocessors in both speaker and speech recognition systems. In addition, there is the appealing advantage of hands-free sound pickup. Performance improvement of the combined microphone-arrays 2 and neural networks 4 is additive or complementary, in the sense that better performance can be achieved when other robust algorithms mentioned above are introduced. Further improvements may be obtained by incorporating the statistical feature leverage of pitch and gain into the MANN system.

Figure 16:
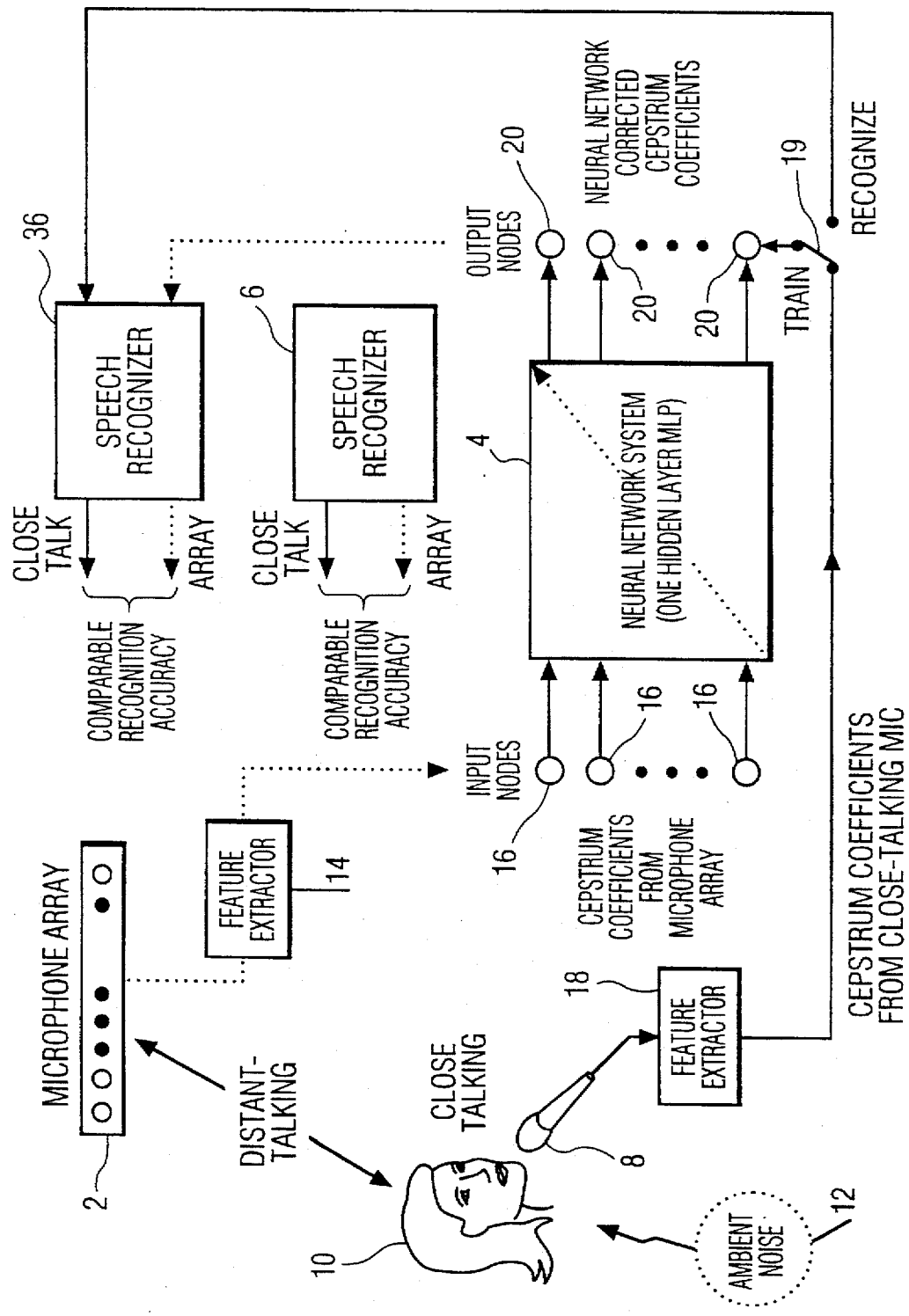
FIG. 16 shows a block diagram of another embodiment of the invention including the speech recognizer system of FIG. 1, and the speaker recognizer system of FIG. 13.

Although various embodiments of the invention are shown and described herein, they are not meant to be limiting. Various modifications may be recognized by those of skill in the art, which modifications are meant to be covered by the spirit and scope of the appended claims. For example, as shown in FIG. 16, in another embodiment of the invention the MANN signal preprocessor of the present invention is used to provide transformed cepstral coefficients of speech to the parallel connected input terminals of a speech recognizer system 6 and speaker recognizer system 36, in a system where both speech and speaker recognition are simultaneously performed.

What is claimed is:

1. A method for preprocessing speech input signals from a microphone array receiving speech from a distant-talking speaker, for converting features of the measured speech of distant-talking reverberant speech input to be substantially similar to those of features of close-talking speech input signals used to train a speech recognition system and/or a speaker recognition system, comprising the steps of:

simultaneously recording the close-talking speech from said speaker positioned close to a microphone, and distant-talking reverberant speech from said speaker positioned a distance from said microphone array, for a predetermined number of sentences;

extracting features of said close-talking speech and said distant talking reverberant speech;

connecting features of the distant-talking reverberant speech to input nodes of a neural network system;

connecting features of the close-talking speech to output nodes of said neural network;

training said neural network system to convert said features of distant-talking reverberant speech to a form substantially similar to said features of close-talking speech relative to said speaker;

disconnecting the close-talking speech from said output nodes after said neural network is trained; and permitting said speaker to speak a distance from said microphone array unencumbered by a close-talking microphone, by providing corrected cepstrum coefficients of said features of the speech representative of close-talking speech from said output nodes of said neural network, for connection to either one or both of said speech recognition system and said speaker recognition system.

2. The method of claim 1, wherein said connecting step for said input nodes includes passing the distant-talking speech through a feature extractor, and connecting the extracted features in the form of cepstrum coefficients to said input nodes.

3. The method of claim 2, wherein said connecting step for said output nodes includes passing the close talking speech through another feature extractor, and connecting the extracted features in the cepstrum coefficients to said output nodes.

4. The method of claim 1, wherein said connecting step for said output nodes includes passing the close-talking speech through a feature extractor, and connecting the extracted features in the form of cepstrum coefficients to said output nodes.

5. The methods of claim 1, further including the steps of:

said connecting step for said input nodes including passing the distant-talking speech through a first feature extractor, and connecting output signals of said first feature extractor to said input nodes, respectively; and said connecting step for said output nodes including passing the close-talking speech through a second feature extractor, and connecting output signals of said second feature extractor to said output nodes, respectively.

6. A system for converting "distant-talking" reverberant speech input signals from sound detecting apparatus at a distance from a speaker, to signals substantially similar to those obtained from "close-talking" where the speaker is close to a microphone, the converted speech features being connected to the input terminals of either one or both of a speech recognized system, and speaker recognized system, each of which was trained with close-talking speech, said conversion system comprising:

said microphone for close-talking speech reception;

said sound detecting apparatus for distant-talking reverberant speech reception;

means for extracting multiple features of both said close-talking speech, and distant-talking reverberant speech, in the form of cepstrum coefficients, respectively;

a neural network system having a plurality of input nodes and a plurality of output nodes;

mode means selectively operable for placing said neural network into either a training mode or a recognition mode, wherein when in said training mode, features of said distant-talking reverberant speech outputted from said means for extracting are applied to said input nodes, and simultaneously close-talking speech outputted from said means for extracting is applied to said output nodes, with the speaker uttering a plurality of sentences selected for training, and when in said recognition mode said output nodes are disconnected from said microphone, thereby making said output nodes available for connection to an input port of either one or both of a speech recognition system and speaker recognition system, for providing speech features thereto that have been converted by said neural network from distant-talking reverberant form to corresponding close-talking form capable of being accurately recognized by said speech and speaker recognition systems, respectively.

7. The conversion system of claim 6, wherein said neural network consists of a multi-layer perceptrons neural network including input, output, and hidden layers.

8. The conversion system of claim 6, wherein said extracting means includes a first feature extractor connected between said sound detecting apparatus and said input nodes, respectively, for inputting features of said output signals of said sound detecting apparatus to said input nodes, respectively, in the form of a plurality of cepstrum coefficients.

9. The conversion system of claim 8, wherein said extracting means further includes a second feature extractor selectively connectable via said mode means between said microphone and said output nodes, respectively, for extracting from an output signal from said microphone a plurality cepstrum coefficients for connection to said output nodes, respectively in the training mode.

10. The conversion system of claim 9, where said mode means consists of a plurality of single-pole-double-throw switching means having individual poles connected to individual ones of said plurality of output nodes, respectively, for selectively connecting each said output node individually to either one output terminal of a plurality of output terminals of said feature extractor, respectively, or to individual input terminals of either one or both of said speech and recognizer systems, respectively.

11. The conversion system of claim 6, wherein said sound detecting apparatus includes a microphone array.

12. The conversion system of claim 11, wherein said microphone array includes a one-dimensional beamforming line array of a plurality of microphones.

13. The conversion system of claim 12, wherein said plurality of microphones of said microphone array are non-uniformly positioned in a line for providing harmonical nesting over four octaves.

14. The conversion system of claim 6, wherein said mode means consists of a plurality of single-pole-double-throw switching means having individual poles connected to individual ones of said plurality of output nodes, respectively, for selectively connecting each said output node individually to either said microphone or to a plurality of input terminals of either or both of said speech and speaker recognizers, respectively.

15. A method for improving the speech recognition accuracy in speech and/or speaker recognition systems in which a speaker roams unencumbered while speaking to provide distant-talking speech in a reverberant environment, comprising the steps of:

training speech and/or speaker recognizer systems with close-talking speech derived from the speaker speaking close to a microphone;

extracting features of said close-talking speech, and said distant talking reverberant speech in the form of cepstrum coefficients, respectively; and training a neural network to transform distant-talking reverberant speech features derived from sound pickup apparatus a distance from said speaker, into close-talking speech features that can be accurately detected by said speech and/or speaker recognizer systems, during normal recognition of speech from the roaming speaker.

16. The method of claim 15, further including the steps of:

configuring a microphone array to provide said sound pickup apparatus.

* * * * *